(12) United States Patent
Shah et al.

(10) Patent No.: US 8,707,409 B2
(45) Date of Patent: Apr. 22, 2014

(54) METHOD AND APPARATUS FOR PROVIDING TRUSTED SINGLE SIGN-ON ACCESS TO APPLICATIONS AND INTERNET-BASED SERVICES

(75) Inventors: Yogendra C. Shah, Exton, PA (US); Inhyok Cha, Yardley, PA (US); Alexander Reznik, Titusville, NJ (US)

(73) Assignee: InterDigital Technology Corporation, Wilmington, DE (US)

( * ) Notice: Subject to any disclaimer, the term of this patent is extended or adjusted under 35 U.S.C. 154(b) by 1085 days.

(21) Appl. No.: 11/843,517

(22) Filed: Aug. 22, 2007

(65) Prior Publication Data
US 2008/0059804 A1    Mar. 6, 2008

Related U.S. Application Data

(60) Provisional application No. 60/839,171, filed on Aug. 22, 2006, provisional application No. 60/887,042, filed on Jan. 29, 2007, provisional application No. 60/912,025, filed on Apr. 16, 2007.

(51) Int. Cl.
G06F 7/04  (2006.01)

(52) U.S. Cl.
USPC ............................................. 726/8

(58) Field of Classification Search
USPC ...................... 713/186, 168, 182; 726/5–8
See application file for complete search history.

(56) References Cited

U.S. PATENT DOCUMENTS

| 6,779,120 | B1 | 8/2004 | Valente et al. |
| 2002/0144119 | A1 | 10/2002 | Benantar |
| 2004/0070604 | A1 | 4/2004 | Bhat et al. |
| 2004/0128558 | A1 | 7/2004 | Barrett |
| 2005/0021975 | A1* | 1/2005 | Liu ............................... 713/182 |
| 2005/0044089 | A1 | 2/2005 | Wu et al. |
| 2005/0049993 | A1 | 3/2005 | Nori et al. |
| 2005/0049994 | A1 | 3/2005 | Thompson et al. |
| 2005/0050053 | A1 | 3/2005 | Thompson et al. |
| 2005/0050054 | A1 | 3/2005 | Clark et al. |
| 2005/0050537 | A1 | 3/2005 | Thompson et al. |
| 2005/0055354 | A1 | 3/2005 | Thompson et al. |

(Continued)

FOREIGN PATENT DOCUMENTS

| EP | 1860906 | 11/2007 |
| JP | 2000-105747 | 4/2000 |

(Continued)

OTHER PUBLICATIONS

Mitchell, Chris. Single Sign-On UsingTrusted Platforms. Royal Holloway. 15 pgs. 2006.*

(Continued)

Primary Examiner — Beemnet Dada
(74) Attorney, Agent, or Firm — Baker & Hostetler LLP

(57) ABSTRACT

A method and apparatus for password management and single sign-on (SSO) access based on trusted computing (TC) technology. The methods implement the Trusted Computing Group (TCG)'s trusted platform module (TPM), which interacts with both proxy SSO unit and web-accessing applications to provide a secure, trusted mechanism to generate, store, and retrieve passwords and SSO credentials. The various embodiments of the present invention allow a user to hop securely and transparently from one site to another that belong to a pre-identified group of sites, after signing on just once to a secured proxy residing at the user's device.

51 Claims, 12 Drawing Sheets

(56) References Cited

U.S. PATENT DOCUMENTS

| | | | |
|---|---|---|---|
| 2005/0144450 A1* | 6/2005 | Voice | 713/169 |
| 2005/0203921 A1 | 9/2005 | Newman et al. | |
| 2005/0278547 A1* | 12/2005 | Hyndman et al. | 713/185 |
| 2006/0041933 A1* | 2/2006 | Yakov et al. | 726/8 |
| 2006/0075224 A1* | 4/2006 | Tao | 713/164 |
| 2006/0218643 A1 | 9/2006 | DeYoung | |
| 2007/0127495 A1 | 6/2007 | de Gregorio et al. | |
| 2007/0266256 A1 | 11/2007 | Shah et al. | |
| 2008/0039096 A1 | 2/2008 | Forsberg | |
| 2008/0059804 A1 | 3/2008 | Shah et al. | |
| 2008/0196090 A1 | 8/2008 | Baron et al. | |
| 2010/0262703 A1 | 10/2010 | Faynberg et al. | |
| 2011/0258447 A1 | 10/2011 | Wei et al. | |
| 2012/0102315 A1 | 4/2012 | Holtmanns et al. | |

FOREIGN PATENT DOCUMENTS

| | | |
|---|---|---|
| JP | 2001-344213 | 12/2001 |
| JP | 2006-513631 | 4/2006 |
| WO | WO 03/100544 | 12/2003 |
| WO | WO 2005/015422 A1 | 2/2005 |

OTHER PUBLICATIONS

Liberty Alliance Project, "Liberty ID-FF 1.2 Errata", Version 1.0, (2004).
Liberty Alliance Project, "Liberty ID-WSF 2.0 Marketing Requirements Document", Version 1.0, (2006).
Liberty Alliance Project, "Liberty Technology Tutorial", Teleconference, (Presented Mar. 1, 2006).
M-Tech Information Technology, Inc., "Integrating Password Synchronization, Reset and Enterprise Single Signon (SSO)", Retrieved from http://psynch.com/docs/integratinq-password-management-with-single-signon.html, (Last visited Feb. 6, 2008).
Oasis, "Authentication Context for The OASIS Security Assertion Markup Language (SAM:) V2.0", OASIS Standard, (Mar. 15, 2005).
Trusted Computing Group, "TCG Mobile Trusted Module Specification", Specification Version 1.0 Revision 1, (Jun. 12, 2007).
Trusted Computing Group, "TCG Specification Architecture Overview", Specification Revision 1.2, (Apr. 28, 2004).
Trusted Computing Group, "TPM Main Part 1 Design Principles", Specification Version 1.2 Revision 85, (Feb. 13, 2005).
Wikipedia, "Web Scraping", Retrieved from http://en.wikipedia.org/wiki/Web_scraping, (Last updated Jan. 8, 2008, Last visited Feb. 6, 2008).
M-Tech Information Technology, Inc., "Integrating Password Synchronization, Reset and Enterprise Single Signon (SSO)", Retrieved from http://psynch.com/docs/integrating-password-management-with-single-signon.html, (Last visited Feb. 6, 2008).
Pashalidis et al., "Single Sign-On Using Trusted Platforms," pp. 54-68, XP019030992 (Dec. 10, 2003).
Hillenbrand et al., "A Single Sign-On Framework for Web-Services-based Distributed Applications", Proceedings of the 8th International Conference on Telecommunications, ConTEL 2005, Jun. 15-17, 2005, 273-279.
Pashalidis, "Interdomain User Authentication and Privacy", Technical Report, RHUL-MA-2005-13, Dec. 23, 2005, 84 pages.
Schmidt et al., "Efficient Application SSO for Evolved Mobile Networks", Wireless World Research Forum Meeting, Sep. 2010, 1-6.
Yamazaki et al., "Proposal of Extended Kerberos Protocol for Secure Biometrics Authentication", Report of Technical Study of Electronics, Information and Communication Engineers IEICE Technical Report, The Institute of Electronics, Information and Communication Engineers, Japan, Feb. 23, 2006, 105(628), 453-458.
Japanese Patent Applicaation No. 2009-525636. Official Notice of Rejection mailed on Sep. 22, 2011.
3 GPP TR 33.924 V9.4.0, "Identity Management and Generic Authentication Architecture (GAA) Interworking (Release 9)," available at http://www.3gpp.org/ftp/Specs/archive/33_series/33.924/, Jun. 2011, 40 pages.
3G Americas, "Security and Trust in Mobile Applications," http://www.4gamericas.org/userfiles/File/3g_Americas_Security and Trust in Mobile Applications Oct. 2008.pdf, Oct. 2008, 29 pages.
3GPP TR 22.895 V1.0.0, "Study on Service Aspects of Integration of Single Sign-On (SSO) Frameworks with 3GPP Operator-Controlled Resources and Mechanisms (Release 11)," available at http://www.3gpp.org/ftp/Specs/html-info/22895.htm, Sep. 2011, 16 pages.
3GPP TR 33.914 V1.0.0, "Single Sign on Application Security for Common IMS—Based on SIP Digest (Release 11)," available at http://www.3gpp.org/ftp/Specs/archive/33_series/33.914/, May 2011, 37 pages.
3GPP TR 33.914 V2.0.0, "Single Sign on Application Security for Common IMS—Based on SIP Digest (Release 11)," available at http://www.3gpp.org/ftp/Specs/archive/33_series/33.914/, Feb. 2012, 48 pages.
3GPP TR 33.924 V10.0.0, "Identity Management and Generic Authentication Architecture (GAA) Interworking (Release 10)," available at http://www.3gpp.org/ftp/Specs/html-info/33924.htm, Mar. 2011, 39 pages.
3GPP TR 33.924 V10.1.0, "Identity Management and Generic Authentication Architecture (GAA) Interworking (Release 10)," available at http://www.3gpp.org/ftp/Specs/archive/33_series/33.924/, Jun. 2011, 40 pages.
3GPP TS 31.102 V10.2.0, "Characteristics of the Universal Subscriber Identity Module (USIM) Application (Release 10)," available at http://www.3gpp.org/ftp/Specs/html—info/31102.htm, Jun. 2011, 227 pages.
3GPP TS 31.103 V10.1.0, "Characteristics of the IP Multimedia Services Identity Module (ISIM) Application (Release 10)," available at http://www.3gpp.org/ftp/Specs/html-info/31103.htm, Apr. 2011, 43 pages.
3GPP TS 33.102 V10.0.0, "3G Security; Security architecture (Release 10)," available at http://www.3gpp.org/ftp/Specs/html-info/33102.htm, Dec. 2010, 72 pages.
3GPP TS 33.220 V10.0.0, "Generic Authentication Architecture (GAA); Generic Bootstrapping Architecture (GBA) (Release 10)," available at http://www.3gpp.org/ftp/Specs/html-info/33220.htm, Oct. 2010, 75 pages.
3GPP TS 33.220 V11.2.0, "Generic Authentication Architecture (GAA); Generic Bootstrapping Architecture (GBA) (Release 11)," available at http://www.3gpp.org/ftp/Specs/archive/33_series/33.220/, Mar. 2012, 91 pages.
3GPP TS 33.221 V10.0.0, "Generic Authentication Architecture (GAA); Support for Subscriber Certificates (Release 10)," available at http://www.3gpp.org/ftp/Spec/archive/33_series/33.221/, Mar. 2011, 25 pages.
3GPP TS 33.222 V10.0.0, "Generic Authentication Architecture (GAA); Access to Network Application Functions Using Hypertext Transfer Protocol Over Transport Layer Security (HTTPS) (Release 10)," available at http://www.3gpp.org/ftp/Specs/html-info/33222.htm, Oct. 2010, 22 pages.
3GPP TS 33.222 V11.0.0, "Generic Authentication Architecture (GAA); Access to Network Application Functions using Hypertext Transfer Protocol Over Transport Layer Security (HTTPS) (Release 11)," available at http://www.3gpp.org/ftp/Specs/archive/33_series/33.2221, Mar. 2012, 22 pages.
3GPP2 S.S0109-0 V1.0, "Generic Bootstrapping Architecture (GBA) Framework," Mar. 30, 2006, 59 pages.
Burr et al., Ed., "Electronic Authentication Guideline," Version 1.0.2, http://csrc.nist.gov/publications/nistpubs/800-63V1 0 2.pdf, Apr. 2006, 64 pages.
Fielding et al., "Hypertext Transfer Protocol—HTTP/1.1," IETF RFC 2616, http://www.ietf.org/rfc/rfc2616.txt, Jun. 1999, 165 pages.
Franks et al., "HTTP Authentication: Basic and Digest Access Authentication," IETF RFC 2617, http://www.ietf.org/rfc/rfc26.17.txt, Jun. 1999, 32 pages.
International Patent Application No. PCT/US2012/035540: International Search Report and Written Opinion dated Aug. 22, 2012, 10 pages.
International Patent Application No. PCT/US2012/044543: International Search Report and Written Opinion dated Sep. 12, 2012, 12 pages.

(56) References Cited

OTHER PUBLICATIONS

Klyne et al., "Date and Time on the Internet: Timestamps," IETF RFC 3339, http://www.ietf/org/rfc/rfc3339.txt, Jul. 2002, 17 pages.

Miller, (Ed.), "Yadis Specification Version 1.0," http://www.infogrid.org/trac/export/1639/docs/yadis/yadis-v1.0.pdf, Mar. 18, 2006, 22 pages.

Niemi et al., "Hypertext Transfer Protocol (HTTP) Digest Authentication Using Authentication and Key Agreement (AKA)," IETF RFC 3310, http:/www.ietf.org/rfc/rfc3310.txt, Sep. 2002, 17 pages.

Recordon, D., "OpenID Provider Authentication Policy Extension 1.0 —Draft 1," http://openid.net/specs/openid-provider-authentication-policy-extension-1 0-01.html, Jun.22, 2007, 10 pages.

Recordon, D., "OpenID Provider Authentication Policy Extension 1.0—Draft 2," http://openid.net/specs/openid-provider-authentication-policy-extension-1 0-02.html, Oct. 23, 2007, 11 pages.

Rosenberg et al., "SIP: Session Initiation Protocol," IEFT RFC 3261, http://tools.ietf.org/html/rfc3261, Jun. 2002, 269 pages.

specs@openid.net, "OpenID Authentication 2.0—Final," http://openid.net/specs/openid-authentication-2 0.html. Dec. 5, 2007, 36 pages.

Thanh et al., "Authentication in a Multi-Access IMS Environment," IEEE International Conference on Wireless & Mobile Computing, Networking & Communication, Oct. 2008, 6 pages.

\* cited by examiner

METHOD AND APPARATUS FOR PROVIDING TRUSTED SINGLE SIGN-ON ACCESS TO APPLICATIONS AND INTERNET-BASED SERVICES

CROSS REFERENCE TO RELATED APPLICATIONS

This application claims the benefit of U.S. provisional application No. 60/839,171 filed on Aug. 22, 2006, U.S. provisional application No. 60/887,042 filed on Jan. 29, 2007, and U.S. provisional Application No. 60/912,025 filed on Apr. 16, 2007 which are incorporated by reference as if fully set forth.

FIELD OF INVENTION

The present invention is related to wireless communications. More specifically, methods and apparatus for providing trusted single sign-on (SSO) access to applications and internet-based services and trusted identification (ID) management are disclosed.

BACKGROUND

With the growing number of wireless communication devices, there is a need to strengthen and simplify a user's authentication process for logging into independent secure websites provided by third-party internet content providers. To gain access into these websites, users are required to set up unique user IDs and passwords for each service. However, using multiple user IDs and passwords that are subject to different password policies is cumbersome and prone to security breaches. Therefore, a method for strengthening the security level of password management while simplifying the user authentication process for wireless communication device user is greatly needed.

Because third-party web service providers maintain separate agreements with wireless network operators, it is impractical to base user authentication process on third-party services on the access network, be they a wireless network such as the radio access network (RAN), a fixed or low-mobility wireless network, (e.g., IEEE 802.16-type networks), or a fixed wireline network. Because service providers and users often access services through multiple RANs, wireless networks, or fixed networks using single identities, users and third-party service providers will likely implement SSO operations across different networks, where the network operators can maintain control over granting user permission In one scenario, wireless network operators and third-party ID service providers could supply uniform user IDs to users to facilitate seamless service continuity across different types of networks, operators, and service providers. Uniform user IDs could resolve transitional problems that result from frequent and high-volume changes across services of different network types and entities, and service provider boundaries.

Poor management of passwords or authentication credentials can have devastating effects on security. Attackers can gain access to sensitive data through weak or stolen passwords. Poor password management may also lead to increases in operational costs. For example, Help Desk call volumes may dramatically increase with an increase in the number of users who call to retrieve or reset their lost or forgotten passwords.

The following are prior art solutions for improving password management as will be described in more detail hereinafter: specific password policies, password-less authentication, biometric factors, password synchronization, credential mapping, enterprise single sign-on (E-SSO), combining E-SSO with password synchronization, web single sign-on (web-SSO), and security assertion mark-up language (SAML).

In order to strengthen user password security levels, an organization may implement specific passwords policies. Common password policies may require users to set up hard-to-guess passwords or to change passwords frequently. Password policies may also log user password history to prevent immediate password reuse or implement lock-out policies to lock out anyone who fails to log-in after a certain number of attempts. While implementing good password policies may strengthen password security, it may also encourage users to set up patterned passwords that are easy to remember and manage. For example, a user might create a password using a combination of characters and numbers, such as @#$%9876, to meet complexity requirements of password policies. The user, however, when prompted by the system to change the password, may create a new password using a variation of the old password, such as @#$%8765 or @#$%7654. Use of patterned passwords weakens password security level because knowledge of a user's password history greatly narrows the number of break-in attempts to variations of the old password. Because complex passwords are hard to remember, strict password policies may cause users to use the same passwords for different services. When passwords are shared across different services, a single password compromised in any of the services will lead to compromising of the password in all of the other services.

Password-less authentication is another technique used to improve the security of authentication processes. Individuals and organizations have adopted authentication methods that do not rely on user IDs and passwords, such as smart cards and authentication tokens. A smart card uses a built-in password—a personal identification number (PIN)—to unlock a complex password stored on the card for user authentication purposes. The set-up eliminates the need for a user to enter a password and uses multifactor authentication, the physical smart card and the PIN stored therein, to authenticate a user. However, smart cards have drawbacks such as high up-front costs for setting up the system and high on-going costs for maintaining Help Desk support for lost, stolen, or otherwise compromised cards.

Using biometric factors to authenticate a user has also become popular. Common biometric authentication devices involve retina scanners, fingerprint scanners, and hand scanners. These devices authenticate a user with data derived from the user's physical attributes. A drawback of these devices is that they are expensive to implement and maintain.

Password synchronization is a technology that allows a user to use a single password across multiple systems. In password synchronization, a password is subject to a single security policy for both password reset and password changes. In this technology, a plaintext copy of a password is extracted from one location and placed in one or more external service locations. To achieve this, a copy of user profile for every user must exist on every system at the outset of the deployment project, and maintained throughout the life of the system. Password change in password synchronization can happen with either a one-way push or a bi-directional push. In one-way password push, a password change in a central system is intercepted and pushed to other locations within the network. In bi-directional password push, a password change can be made in any system and is propagated throughout the entire password architecture.

The main problem with one-way password push lies within the security measurement of the systems that store passwords. Because a synchronized password is used across systems, a security breach in any system will result in a disastrous security breach in all systems. Although bidirectional password synchronization provides more user flexibility, it can cause additional problems, such as creating an infinite loop of password changes. Because the system is programmed to propagate new data to the rest of the system, the system may be caught in an endless password update process propagating multiple password changes on a single password.

Accordingly, although password synchronization relieves users from having to remember and manage multiple passwords within a network, password synchronization also weakens password security by allowing a user to use one password to access multiple services.

Credential mapping, commonly referred to as E-SSO, is a technology that stores, retrieves, and "types-in" user IDs and passwords on behalf of a user. To implement E-SSO, a copy of the E-SSO software must be installed on each WTRU. User ID and password for every system and application are stored in a local file, a network-attached database, or a user directory. After the initial setup, users can sign into their workstation, either as they did before, or through a new E-SSO software interface. When users request to connect to applications using their workstation, the E-SSO software automatically populates the user ID and password fields of the applications' login pages.

In an E-SSO system, users sign into their workstation with either one or two sets of user credentials (e.g., user IDs and passwords): 1) when users only need to log into the E-SSO software and not to their workstations; and 2) when users must log into both.

Some E-SSO systems support the use of authentication technologies other than passwords to sign into the workstation and to access a user's credential profile, including smart cards, authentication tokens or biometric samples. In addition, some E-SSO technologies are configured to completely control password management for each target destination. The approach eliminates the need for users to remember their passwords for any target systems. The E-SSO software automatically signs in for the user on behalf of the user.

Under E-SSO, users also do not have to change passwords on target systems. The software recognizes or anticipates password change requests and changes the password accordingly on behalf of the user. The credential mapping password management features work best if the target systems are accessed only through the credential management software.

Although an E-SSO system provides functionalities to safeguard user passwords, the system has the drawback of being costly and cumbersome to set up. Implementing an E-SSO system requires not only creating a login ID profile for each user, but also storing current passwords for each user and for each target application. Setting up an E-SSO system further requires installing client software and deploying credential database for storing user IDs and passwords. The database may be obtained through a dedicated network service, or by extending the scheme of an existing directory (e.g., active directory, LDAP, NDS). A credential database has several requirements of its own. To carry out its purpose, the database must be fast and available, as a failure in this database will prevent large numbers of users from signing into any system. Additionally, the database must also be secure, as a compromise in the database may lead to a compromise of every user credential in all systems.

As a central password control system, E-SSO introduces a single point-of-failure. A user cannot log into any system if the E-SSO system or the credential database is down. In addition, E-SSO technology does not support an authentication process with applications that support multiple user interfaces (e.g., client, web, phone, etc.) Further, because E-SSO relies on Windows "screen scraping" technology, deployment and management of an E-SSO system can be costly, especially across multiple types of workstations. Accordingly, an E-SSO system not only is tedious, time consuming, and costly to set up and enroll, but is also susceptible to a single point-of-failure.

Combining E-SSO with password synchronization can address some of the shortcomings of implementing an E-SSO system alone. For example, without password synchronization technology, users will not be able to use their E-SSO passwords to log into applications using alternative user interfaces. Because users do not necessarily know their own passwords, user who normally uses proprietary clients such as Microsoft Outlook might not be able to access e-mail accounts through web portals. By combining password synchronization with E-SSO, users can use their primary E-SSO passwords to log-in to other applications through alternative interfaces, such as web portals. Further, deploying password synchronization system before deploying E-SSO system reduces time and effort in obtaining a user ID profile for each user.

In E-SSO systems, user credentials are typically encrypted with a key derived from the primary E-SSO password. Loss of a primary E-SSO password, under this configuration, results in a loss of user credentials to every system. Even after the loss E-SSO password is reset, the encrypted credentials will not be accessible, because the credentials are encrypted with a key derived from the lost password. In other words, resetting a user's E-SSO primary password will not retrieve the user's credentials, and the user must re-enroll with the E-SSO system.

To address this problem, an E-SSO system must provide a "back door," to recover user credentials after an E-SSO password reset. A password reset system must integrate with this back door system or provide its own back door. After resetting a user's primary E-SSO password, a password reset system must recover the user's previous password from the safe storage, decrypt the user's old credentials, and re-encrypt them with the new password and key, so that the E-SSO client software is accessible again.

Integrating password reset, password synchronization, and E-SSO system resolves this problem and allows organizations to enjoy the benefits of rapid deployment, automated sign-on, and self-service problem resolution. However, the combination of technologies does not address the issue of securing passwords and log-in credentials. Further, a compromise in either the client or server software, or the database compromises the user profiles. Lastly, the combination still fails to provide ways to verify the "health" state of the systems engaging in password synchronization and E-SSO. Without this verification, once a user is authorized by the system, the user can access the system even when the system is compromised.

Web-SSO works with applications and resources accessed through a web browser. In web-SSO, access to web resources is intercepted either by a web proxy server or a component on a targeted web server, and unauthenticated users who attempt to access a web resource are diverted to an authentication prompt, and redirected to the original site only after a successful sign-on. Cookies are most often used to track a user's authentication state, and the web-SSO infrastructure extracts user identification information from cookies and passes it onto web resources.

Screen scraping and federation are two most important prior art technologies that are used in web-SSO. A common type of screen scraping is web scraping. Web scraping, also referred to as HTML scraping or page scraping, is a technique wherein a computer program, web scraper, extracts data from a web page. Web scraping can be used in E-SSO or web-SSO.

Screen scraping technologies are useful because web pages are built using text-based mark-up languages (e.g. HTML) which often includes information in a text form. In contrast, data exchange between programs is usually accomplished using data structures designed for machines that are not readily understandable by humans. Similarly, data output intended for users is often not suitable for machine interpretation. Therefore, screen scraping is needed to accomplishing the transfer of data between programs, by first extracting machine-friendly data from HTML and other markup machine languages and then exchanging the extracted machine-friendly data between programs.

When performing screen scraping, reading data from a computer text display is generally done by reading the terminal's memory through its auxiliary port, or by connecting the terminal's output port to another system's input port. In these cases, screen scraping can also refer to computerized parsing of web pages.

Screen scraping is most often done to: (1) interface a legacy system that is incapable of providing an alternative mechanism that is compatible with current hardware; or 2) interface a third-party system that provides a less sophisticated application program interfaces (API). In the latter case, a third-party system may consider screen scraping as unwanted, for reasons such as increased system load, loss of advertisement revenue, or loss of control of information content.

FIG. 1 illustrates exemplary procedures in a prior art WTRU that uses web-SSO with web scraping. In this diagram, it is assumed that the WTRU is equipped with proxy software and that the web-accessing application on the WTRU interacts cooperatively with the SSO proxy software to allow the proxy to establish and control procedures for SSOs into web services. For example, when a browser receives a request to access an URL, it transmits the URL to the SSO proxy software to verify whether web-SSO can be used to access the particular website.

Federation is the second import technology used for web-SSO that uses standard-based protocols to enable one application to assert the identity of a user to a second entity, thereby eliminating the need for redundant authentication. Specification standards that support federation include Liberty Alliance ID-FF, OASIS, SAML, and Shibboleth, which is being developed for Internet2. Liberty Alliance is a central organization that has developed specifications for identity federation framework (ID-FF) and identity web service framework (ID-WSF). The Liberty Alliance provides a set of broad-based industry consortium developing suites that contain specifications defining federated identity management and web services communication protocols. The protocols are designed for both intra-enterprise and inter-enterprise deployments. OASIS is a non-profit organization developing solutions for e-business. SAML, which is currently in version 2.0, is a mark-up language for security assertions, which includes user identification information that enables SSO authentication. Shibboleth is an Internet2 middleware initiative (NMI) project that has created an architecture and open-source implementation for authentication and authorization infrastructure based on federated identity and SAML.

FIG. 2 illustrates procedures for web-SSO by a WTRU user that uses Liberty Alliance ID-FF. In the context of web-SSO, Liberty Alliance enables a user to log into a single account and request services from several services providers within a "circle of trust," managed by an ID management entity in the network. A distinctive feature of Liberty Alliance is the "federation" process. Instead of deciding what kind of right each user has to access a service provider (SP) without undergoing re-authentication, Liberty Alliance allows users to decide if they want to access an SP without re-authentication. To obtain this right, a user must first be authenticated by an identity provider (IDP) that is recognized by the SP. This makes Liberty Alliance a practical framework for identity management in the context of extended-enterprise applications, wherein users typically entrust the management of personal data to the enterprise.

SAML is an XML standard created by the OASIS organization for exchanging authentication and authorization data between security domains; that is, between an IDP and a SP. FIG. 3 depicts the relationships among the SAML components. SAML tries to solve the web-SSO problem by facilitating seamless and reliable exchanges of authentication procedures and security assertion information between the network entities. The SAML standard utilizes the following components: 1) assertions component; 2) protocols component; 3) bindings component; 4) and profiles component. The assertions component allows one entity to assert the characteristics and attributes of another entity, such as user name, status, email address, membership in groups, etc. Protocol components are encoded in an XML schema and defines a lists of request-response related protocols.

The binding component defines how SAML protocol messages are transported within SOAP messages and how SOAP messages are transported over HTTP. SOAP messages are well-formed XML messages that are constructed according to the W3C organization SOAP version 1.2 envelope and encoding rules. FIG. 4 shows an example of an exchange between SAML components in a typical binding case. The profiles component is the core of the SAML specification; it defines how SAML requests and responses are transported.

Although both Liberty ID-FF and SAML play important roles in strengthening password security levels, neither addresses how to secure sensitive information necessary for the web-SSO within the user's devices or on IDP and SP. Further, because both Liberty ID-FF and SAML ultimately relinquish control of a user authentication process to IDPs and SPs, thereby requiring the disclosure of user personal information, user profiles may be compromised in the process.

Trusted computing techniques have appeared in the literature and in products, mostly under the technical umbrella of the Trusted Computing Group (TCG). Trusted computing is based on physical security of a dedicated, physically isolated hardware module that provides cryptographic functions and protected storage.

The TCG has developed various technologies that provide methods for computing entities to assert the integrity of systems, to validate an authentication process when an appropriate trust level is established, and to perform assessment of and decisions on exchange of information and processing with other devices based on the manifested trust levels of such target devices.

TCG defines a core platform module called the trusted platform module (TPM). FIG. 5 depicts the composition of a TPM, which provides physical protection of the TPM module and its interfaces. The module also provides protection for volatile and non-volatile memory spaces and cryptographic functions for performing encryption and digital signing. TPM uses platform configuration registers (PCR) to capture the "state" of the platform and its software components by HASH extending and user device specific and secure endorsement keys (EK), based on a public key infrastructure (PKI). The EK is never exposed outside, but its aliases, the attestation identity key (AIK), is used to validate the platform's integrity values. Furthermore, TPM uses a process that "seals" data in conjunction with PCR values signed by AIKs in memory, so that data can be accessed or extracted only when platform or software integrity, as measured and verified by the matching PCR values from the TPM and from the sealed memory, is verified.

FIG. 6 illustrates how an external entity (a challenger, or a verifier) can make requests for platform attestation using the TPM, AIKs and the private certification authority (PCA). Such an attestation mechanism, can be useful for improving the trust and security aspects of SSO techniques.

TCG has also specified a detailed TPM software stack (TSS) for use by a computing platform that includes a TPM. Each TSS module comprises components that provide specialized functions. The primary design goals of these components are to supply a single, synchronized entry point into to the TPM, to conceal building command streams with appropriate byte ordering and alignment from the applications, and to manage TPM resources.

FIG. 7 shows the architecture of TPM and TSS layers. TSS modules include the following components: 1) TSS device driver library interface (TDDLI) that interfaces to the standardized TPM device driver library (TDDL); 2) TSS core service interface (TCSI) that interfaces to the TPM's TCS commands (not shown); and 3) TCG service provider interface (TSPI) that interfaces with the TCG's TSP commands (not shown) and sits just below the application. On the TPM side, the TDDL sits on top of the vendor specific TPM device driver, which is in communication with the TPM.

The TDDLI ensures that different implementations of the TSS will properly communicate with any TPM, will provide an OS-independent interface for TPM applications, and will allow the TPM vendor to provide a software TPM simulator as a user mode component. The TDDL provides a transition between user mode and kernel mode on the platform. The TCG core services (TCS) provides an interface to a common set of platform services. The TCS provides the following four core services: 1) context management, which implements threaded access to the TPM; 2) credential and key management, which stores credentials and keys associated with the platform; 3) measurement event management, which manages event log entries and access to associated PCRs; and 4) parameter block generation for serializing, synchronizing, and processing TPM commands.

The TCG service provider (TSP) is a C interface to the TPM, based on an object-oriented architecture. The TSP resides within the same process address location as the application. Authorization takes place in this layer, either though using a user interface coded to this layer or via a callback mechanism at the TCS layer. In order to provide a standardized authorization interface to end users, authentication services are not provided by local application, but rather, by the platform.

The TSP provides two services: 1) context management; and 2) cryptography. The context manager provides dynamic handles that allow efficient usage of application and TSP resources. Each handle provides a context for a set of interrelated TCG operations. Different threads within the application may share the same context or may acquire separate contexts.

To make full use of the TPM protected functions, supporting cryptographic functions must be provided. The TSP does not provide this support except that which is necessary to perform operations required by the TPM specification. In particular, bulk data encryption is not exposed by the interface. Examples of TPM-specified cryptographic functions include message digesting and encryption of a small amount (less than 1024 bytes) of data.

SUMMARY

A method and apparatus for password management and SSO access based on trusted computing technology are disclosed. The method implement the TCG's TPM, which interacts with both proxy SSO unit and web-accessing applications to provide a secure, trusted mechanism to generate, store, and retrieve passwords and SSO credentials. The various embodiments allow a user to hop securely and transparently from one site to another that belong to a pre-identified group of sites, after signing on just once to a secured proxy residing on the user's device.

After the user signs on to a mobile device, the proxy SSO unit residing on the device intercepts the applications that attempt to access secure sites belonging to an enrolled group, and uses the per-site secure password that is generated and held protected by the TPM to sign-on to individual sites within the group. The proxy SSO unit, which may be implemented in hardware or software, is also protected for its integrity by the TPM. This provides a high level of trust for the process of using a SSO to different sites via the TPM-generated randomized passwords that the user does not have to remember or store separately.

The SSO feature may be applied to any number of secure sites and the list can grow as the user navigates through the internet and accesses new web servers. Each web server has associated with it a secure sign-on certificate, which is associated with the TCG generated user credentials that enable autonomous operation of the SSO procedures; from initial enrolling on a web server to subsequent log on and authentication sessions. As an option, the user may be offered a prompt by the proxy software of the group of websites to whose SSO web-access will be enabled. The user will be able to choose whether to allow the SSO operation to the group of websites indicated by the proxy software or to a subset.

Additional embodiments include mechanisms for TPM enhancement of E-SSO, and web-SSO with federated identity management.

BRIEF DESCRIPTION OF THE DRAWINGS

A more detailed understanding of the invention may be had from the following description of a preferred embodiment, given by way of example and to be understood in conjunction with the accompanying drawings wherein.

DETAILED DESCRIPTION OF THE PREFERRED EMBODIMENTS

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless or combination wireless/wired environment. When referred to hereafter, the terminology "base station" includes but is not limited to a Node-B, a site controller, an access point (AP), or any other type of interfacing device capable of operating in a wireless environment.

Figure 1:
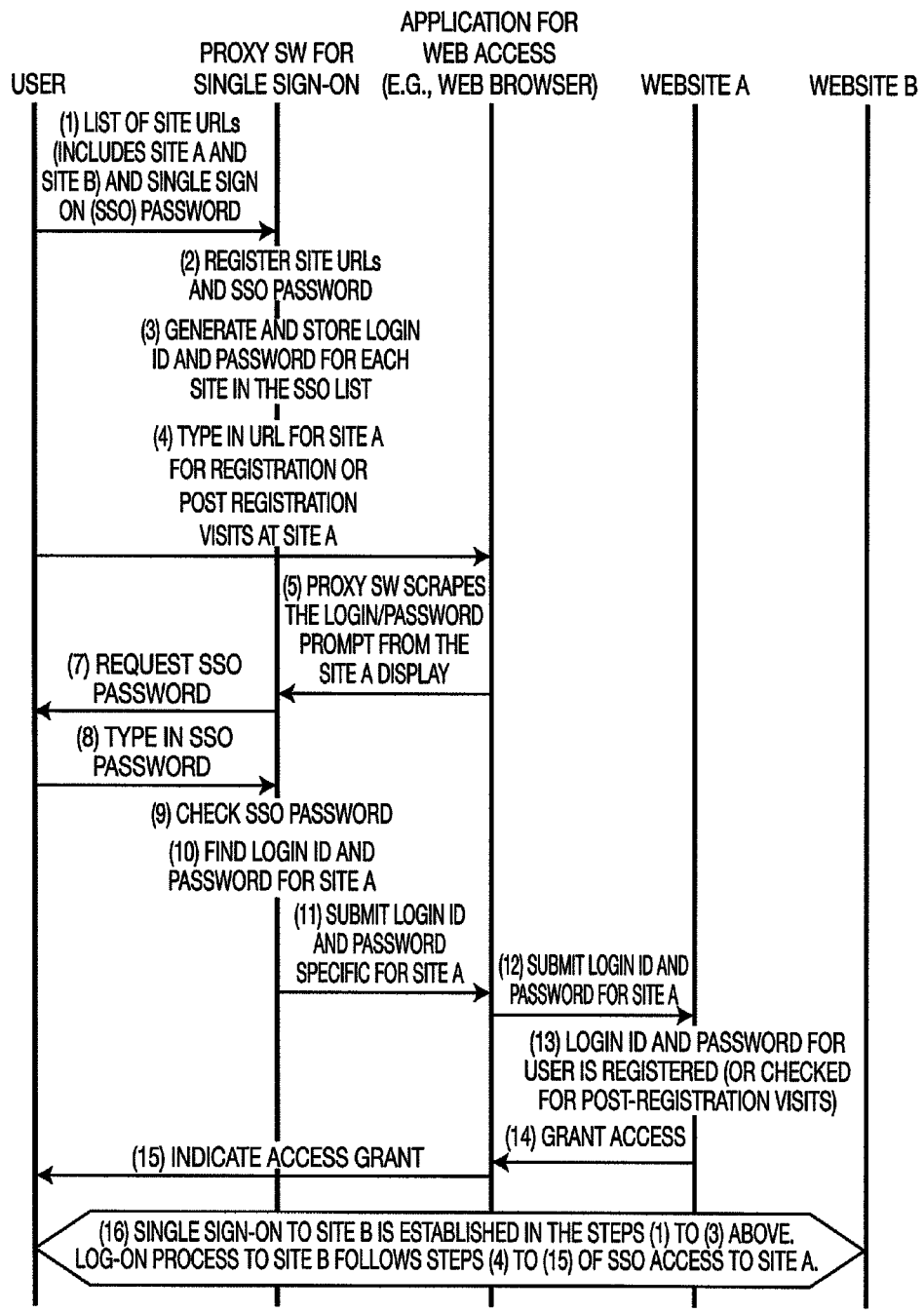
FIG. 1 is an exemplary flow diagram for web-SSO for a WTRU according to the prior art.
Figure 2:
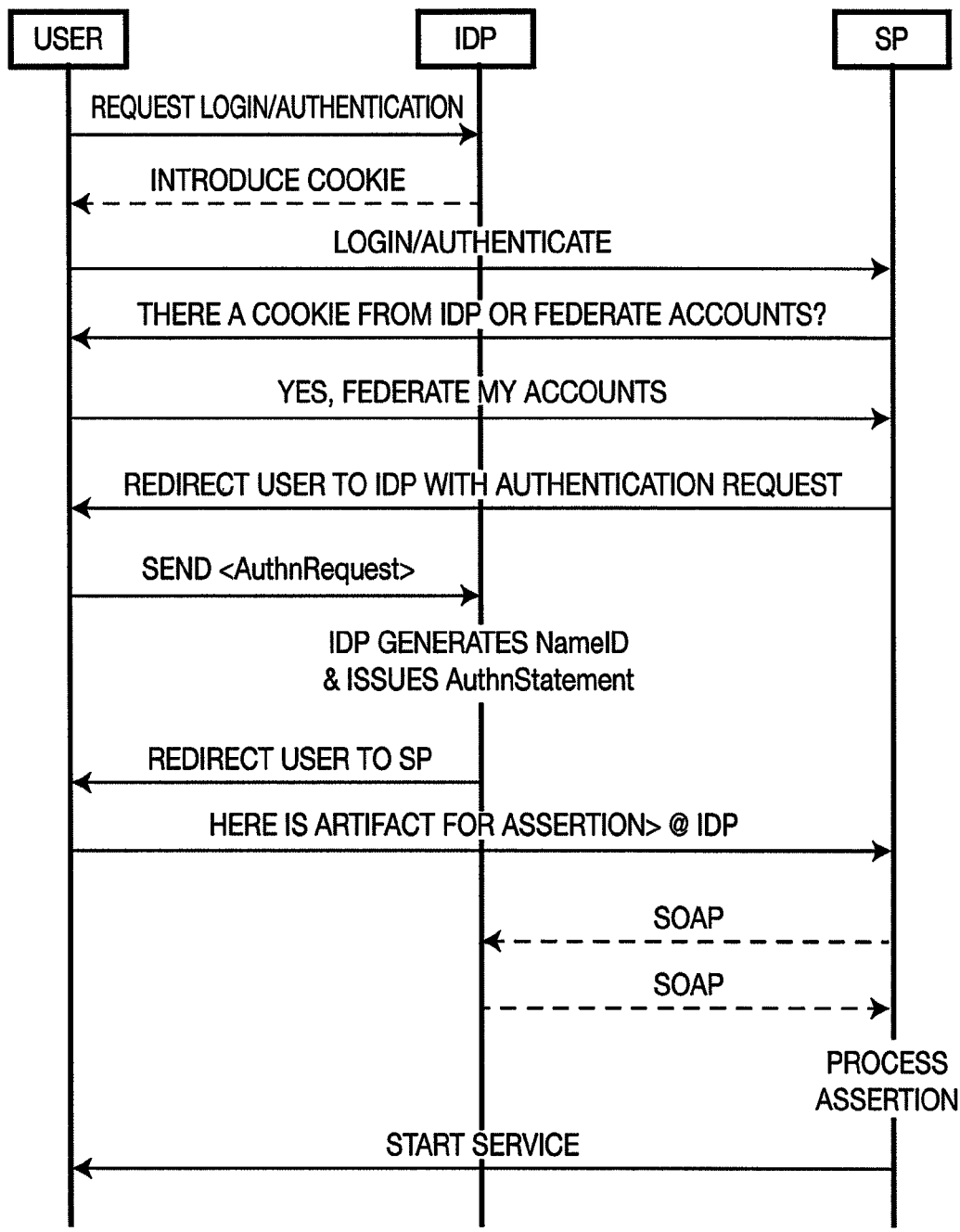
FIG. 2 is an exemplary flow diagram for web-SSO process a liberty alliance ID-FF equipped WTRU according to the prior art.
Figure 3:
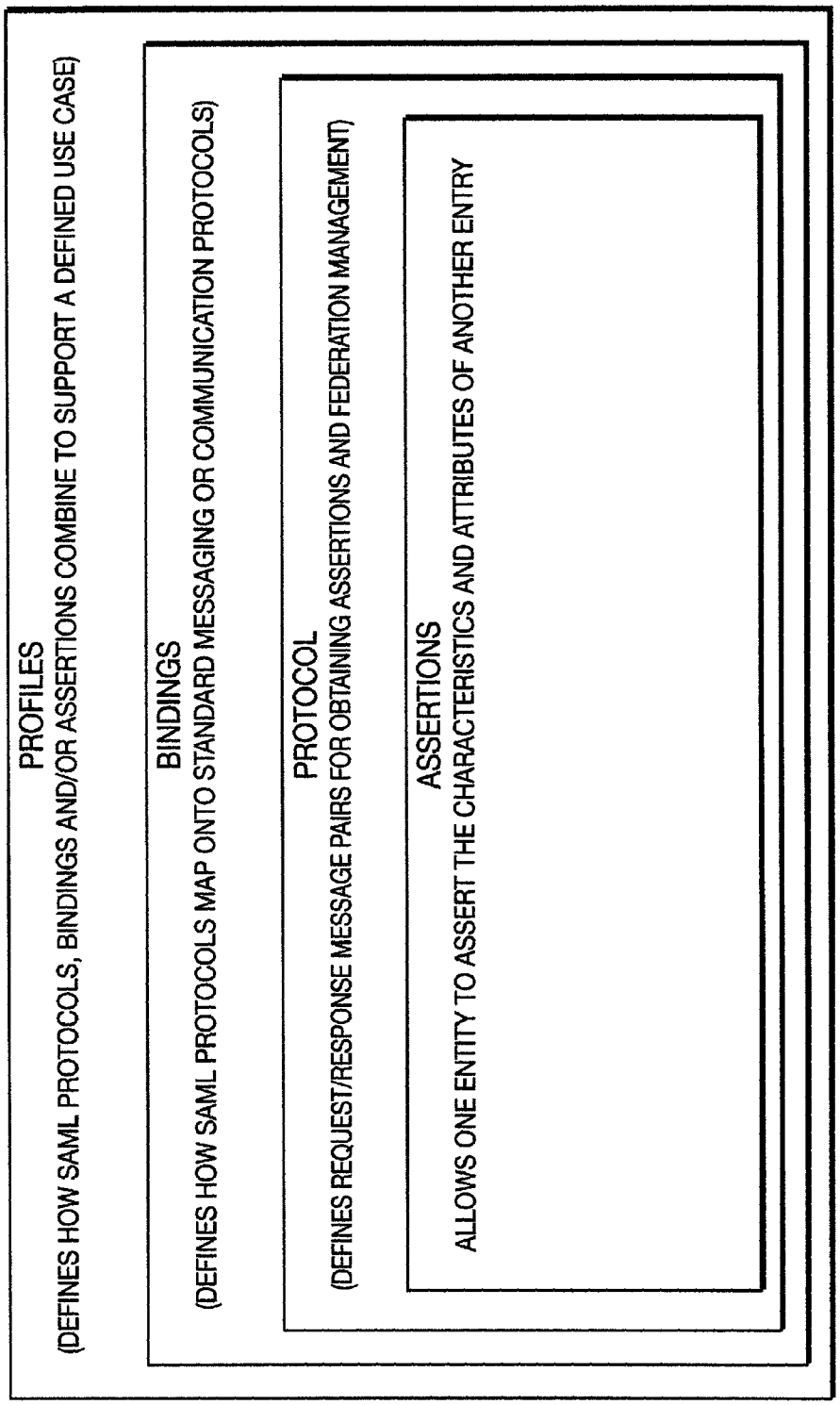
FIG. 3 shows a block diagram of the relationships among SAML components.
Figure 4:
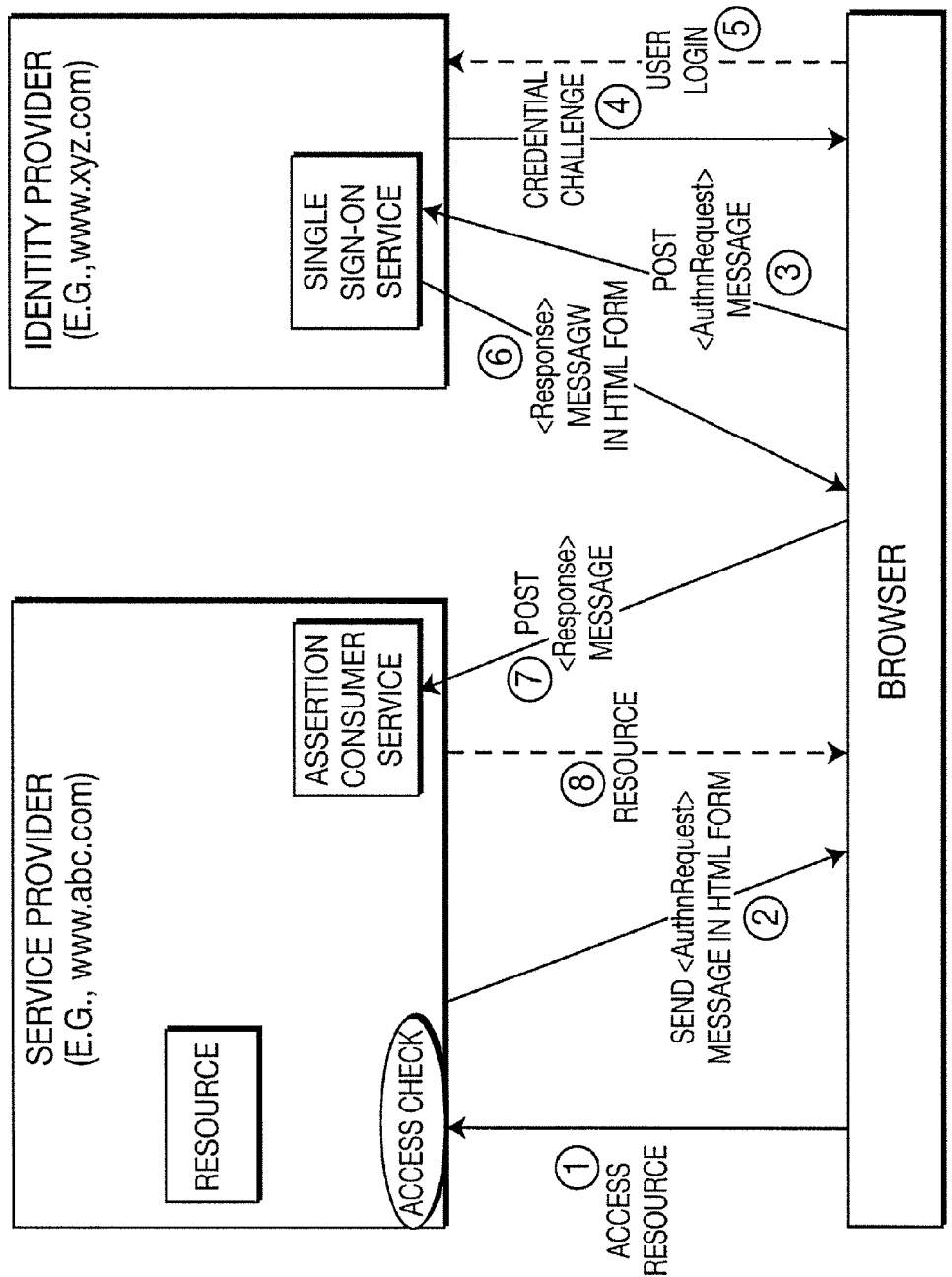
FIG. 4 shows an example of SP-initiated post-post binding in SSO.
Figure 5:
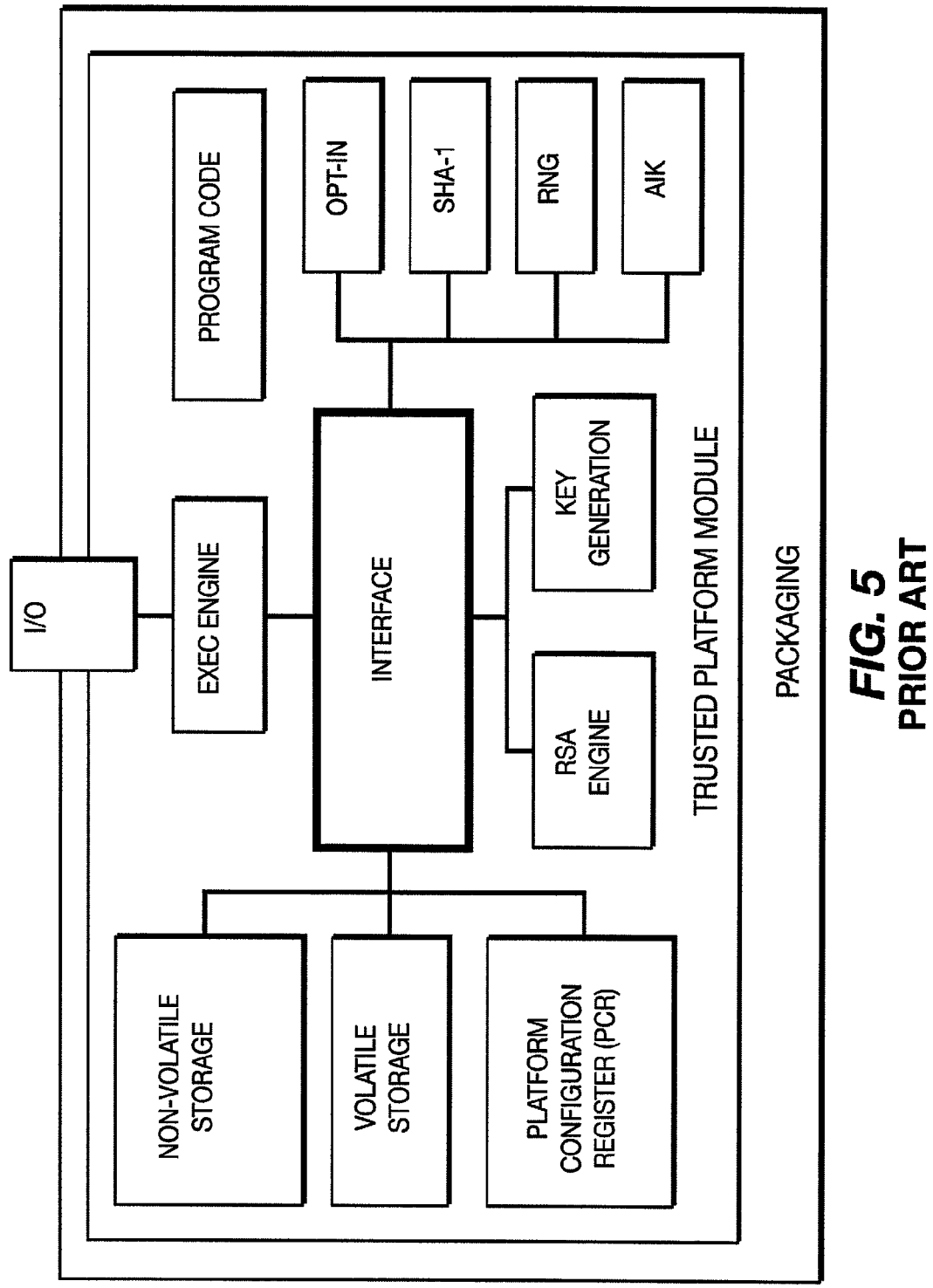
FIG. 5 shows a block diagram of a generic TPM.
Figure 6:
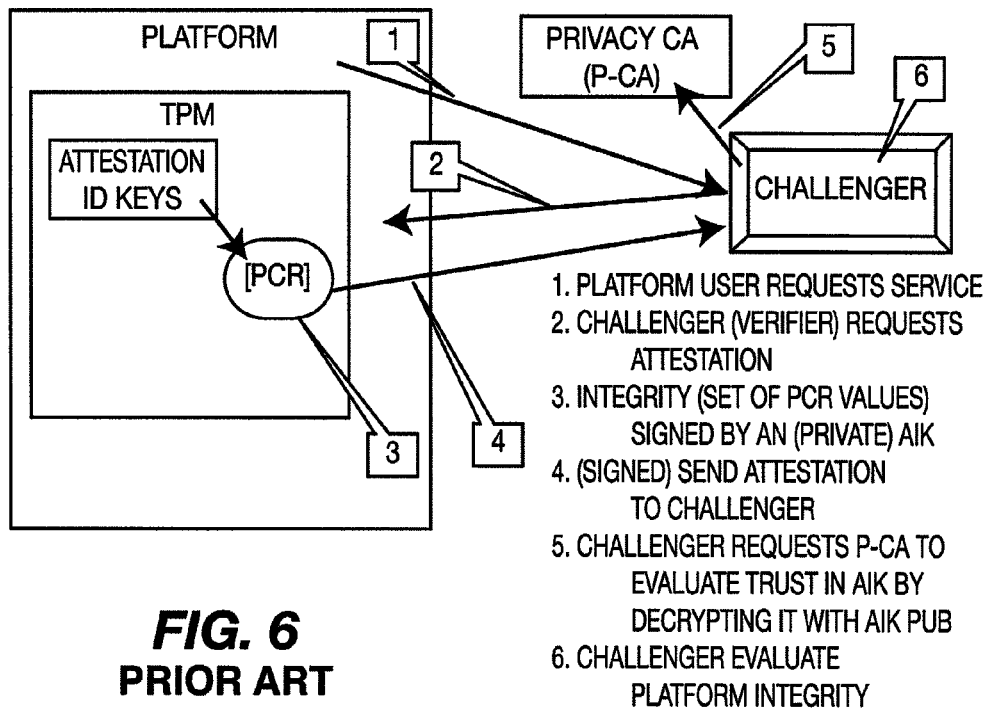
FIG. 6 shows an exemplary process for AIK credential verification by an external party, using TPM AIKs.
Figure 7:
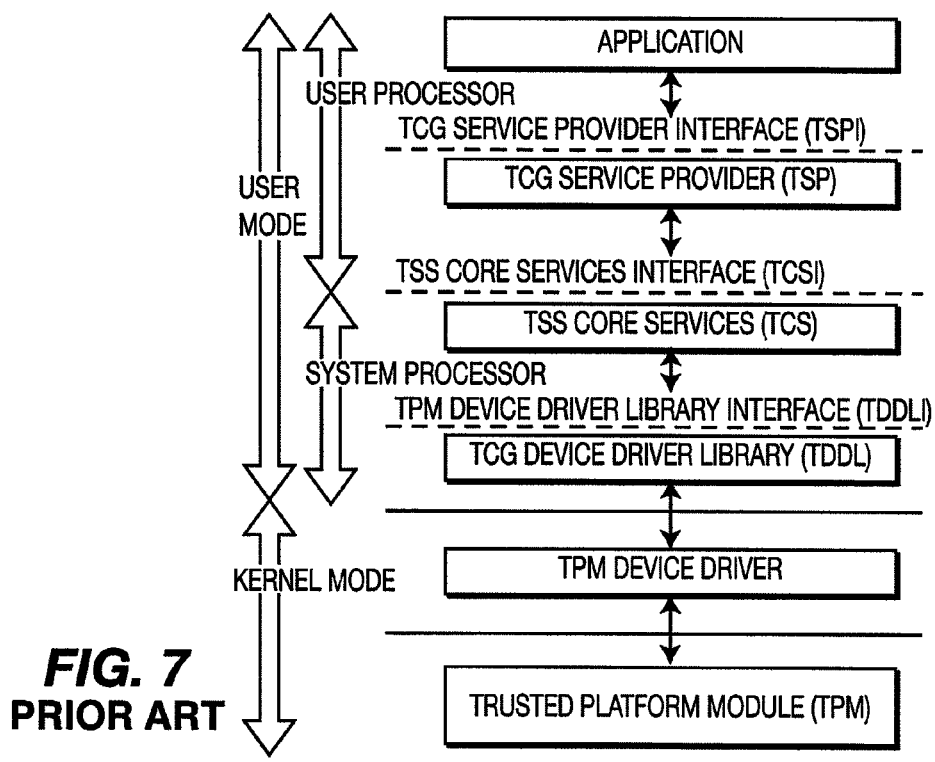
FIG. 7 is a block diagram of the different layers within a TPM and TSS.
Figure 8:
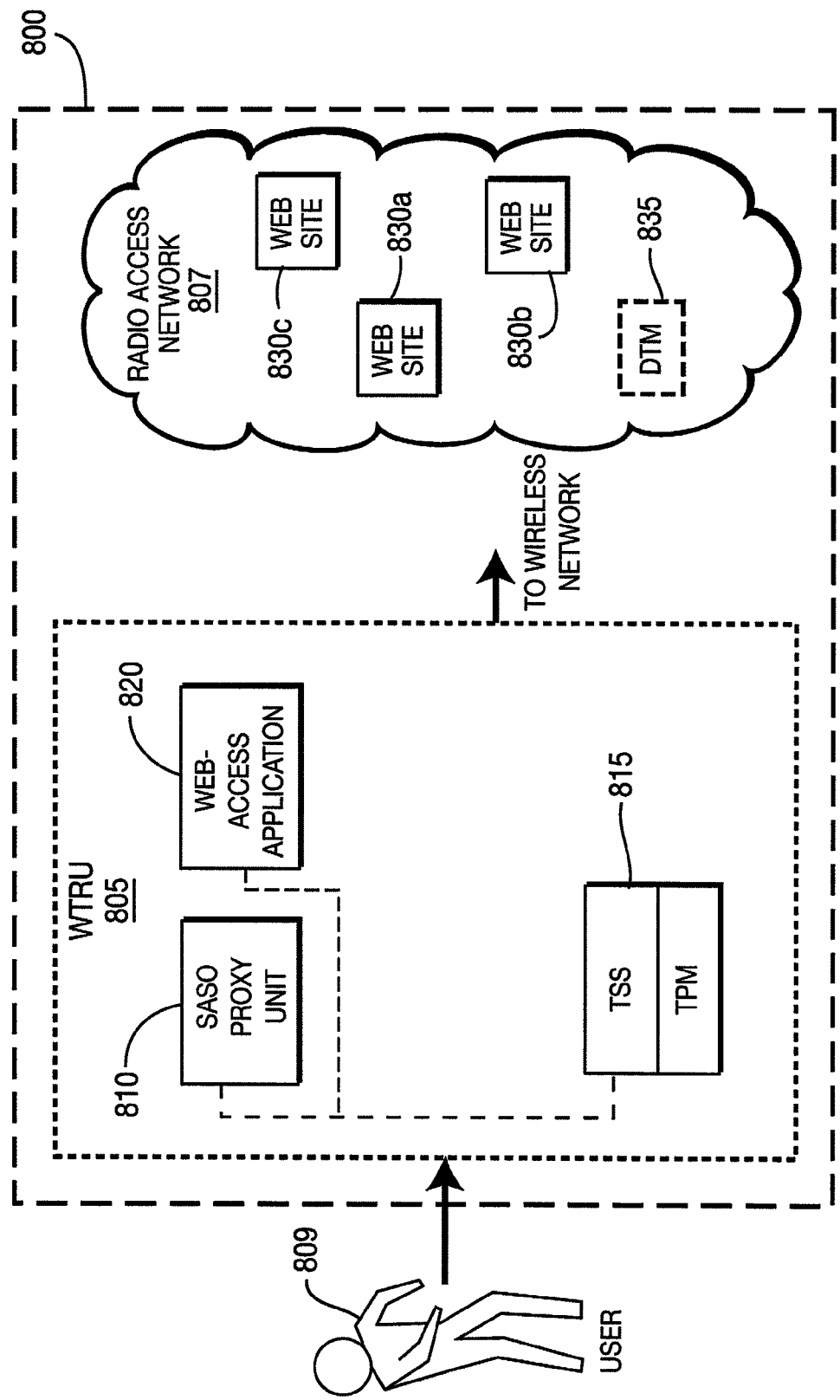
FIG. 8 is an exemplary block diagram of a wireless communication system.

FIG. 8 is an exemplary block diagram of wireless communication system 800, that includes at least one WTRU 805, and a radio access network (RAN) 807. The WTRU 805 interacts with a user 809 and includes a single automatic sign-on (SASO) proxy unit 810, a TPM/TSS 815, a web access application (WAA) 820. The TPM/TSS 815 interacts with both the SASO proxy unit 810 and the WAA 820 to provide a secure, trusted mechanism to generate, store, and retrieve passwords and SSO credentials. SASO proxy unit 810 is protected for its integrity by the TPM/TSS 815, thus enabling a high level of trust while using SSO for different websites. The TPM/TSS 815 provides this high level of trust by storing and generating randomized passwords that the user does not have to separately remember. The RAN 807, typically includes access to at least one website 830a-c. Optionally, the RAN 807 may also include a device trusted mirror (DTM) 835.

In order to minimize the number of passwords the user 809 has to remember, a mechanism is provided whereby the user 809 first creates a list of sites or applications, and then the SASO proxy unit 810 records the information on both its own log and a log that is later kept securely by the TPM/TSS 815 using either a storage key binding or with internal storage. The SASO proxy unit 810 uses either cooperative binding or an intercepting technique such as web scraping to interpret both the user's request for access to applications or web sites 830, and the prompt for log-in and/or password type-in from the application or the web site 830.

The user's 809 credentials (also referred to as root identity) can be stored securely, in the TPM/TSS 815 itself or another secure storage device such as the USIM. Additionally, a key hierarchy can be created from this root identity. The root identity is held securely within the device and never divulged outside of the secure or trusted domain.

When the user 809 signs on for the first time to a secure web site 830, the WAA 820 interacts with the SASO proxy unit 810 and the TPM/TSS 815 to create high entropy, a unique user ID and high-entropy password which is associated with the certificate information for the web site 830. Thereafter, whenever the user 809 desires access to the web site 830, the user's credentials are automatically entered into the information sent over the communication link through interaction between the WAA 820, the SASO proxy unit 810, and the TPM/TSS 815.

Optionally, whenever the user 809 accesses the RAN 807, the WTRU 805 uses the SASO proxy unit 810 and the TPM/TSS 815 in the same manner to establish a trust relationship with relevant network elements in the RAN 807 such as service providers (SPs) or identity providers (IDPs) (not shown). Alternatively, the RAN 807 maintains a special system component or a relationship to a trusted $3^{rd}$ party entity, such as a DTM 835. Once the WTRU 805 has an established trust relationship and a secure link with the RAN 807, the DTM 835 acts as a proxy for the mobile's trust service and database for the passwords created for each secure website.

The user 809 may gain access to the WTRU 805 functionality and thus the internet by using a single login ID and password to access a WTRU lock mechanism. Once logged in, all other services are transparently handled by the WTRU 805. Additionally, key fobs, smart cards, and/or biometrics may be used to provide secure two or three factor authentication to access the phone features. Optionally, the authentication credentials may be sent to the RAN 807 for authentication and to enable user access to the device.

The TPM/TSS 815 provides inherent security for the data—including passwords—that it cryptographically protects and stores, by providing a physically protected boundary. However, the strength of data protection also partly depends on the strength and the freshness of the data itself in the case of passwords or crypto keys used to protect such data. Even strongly protected data can be broken, given sufficient samples of encrypted data and enough computing power and time at the disposal of the attacker. Therefore, updating the keys and, if necessary, re-encrypting data with a new key, can provide an additional security barrier to an eavesdropper's attempt to decipher encrypted identity and authentication data. The keys and passwords used for universal authentication should be updated frequently by the TPM/TSS 815. Such updating will require a protocol with which to initiate, acknowledge, and execute necessary procedures related to the data and/or key updates.

In an alternative embodiment, the WTRU 805 has inside it a universal subscriber identity module (USIM) (not pictured). The USIM, as an isolated and protected entity, provides a second secure execution environment for software as well as a secure storage place for data such as the passwords. Therefore, the SASO Proxy unit 810 may reside in the USIM. The WAA 820 may also reside in the USIM.

In another alternative embodiment of the WTRU 805, a USIM may replace the TPM/TSS 815 as the sole "secure" execution environment. In this case, the WTRU 815 may not have the functionality to execute platform and/or application integrity measurement, verification, and attestation functionality that is normally provided by a TPM/TSS 815. However, since a USIM is an isolated, protected, and secure execution environment, it enables secure execution of the SASO proxy unit 810 and possibly even the WAA 820. The USIM could also be configured to generate and store of high-entropy site-specific passwords and also to store SSO password and SSO credentials.

In yet another alternative embodiment of the WTRU 805, an "expanded" USIM, as disclosed in U.S. patent application Ser. No. 11/745,697, filed May 8, 2007, and which is incorporated by reference as if fully set forth herein resides in the WTRU 805 and provide a secure execution environment for both the SASO proxy 810, the WAA 820 and the TPM/TSS 815.

Figure 9:
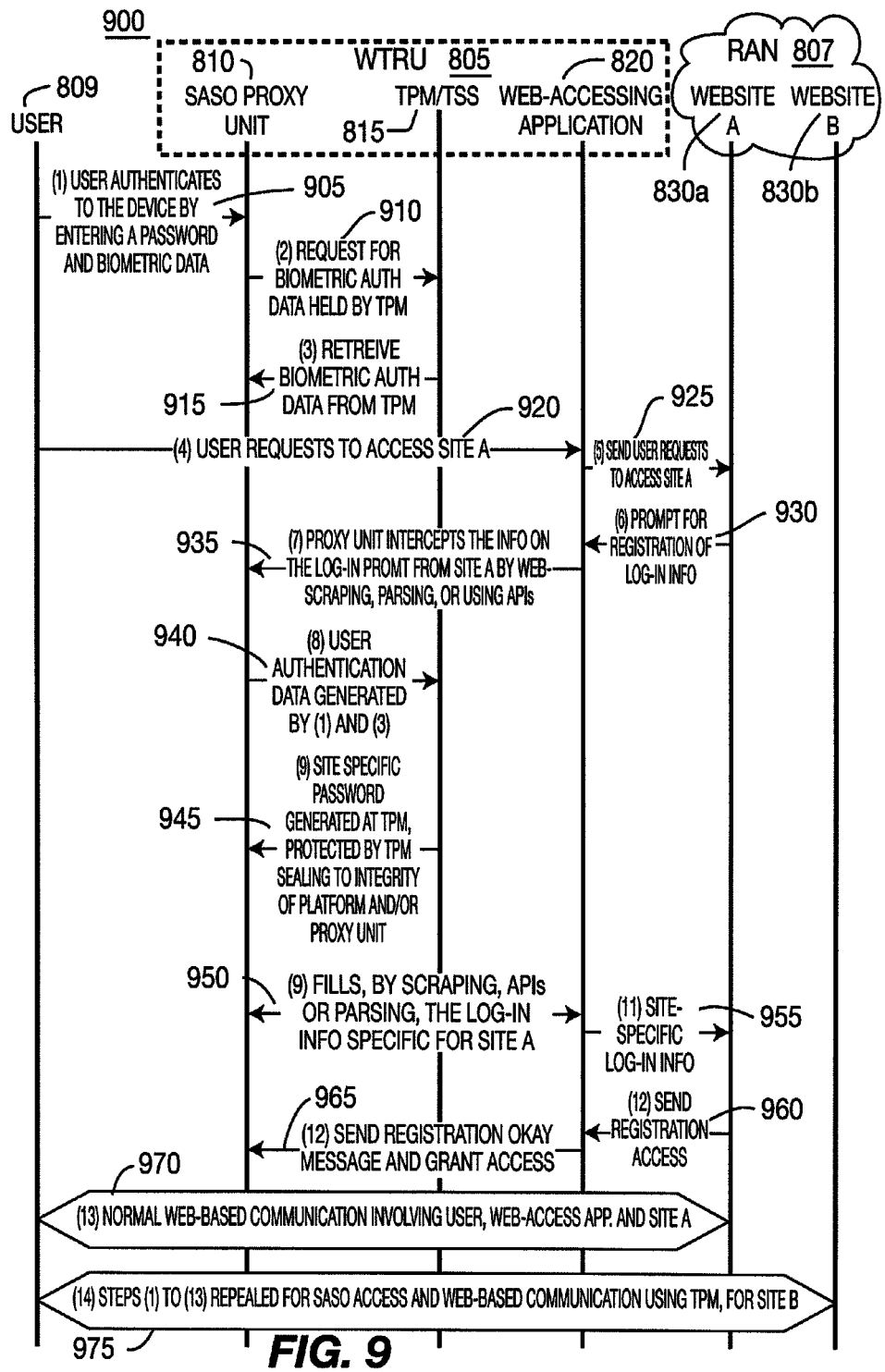
FIG. 9 is exemplary flow diagram of an embodiment of secure automated sign-on using a TPM/TSS.

FIG. 9 shows the signaling between components of the system 800 of FIG. 8 in accordance with an alternative embodiment. Specifically FIG. 9 shows an exemplary procedure for SASO for Web access using the TPM/TSS 815.

The procedure is initiated when the user 809 gains access to the WTRU 805 through secure one factor, or preferably two or three-factor, authentication, at step 1005. These authentication factors are the mechanisms that allow the SASO proxy unit 810 to access the secure information held within the TPM/TSS 815. If bio-metric $2^{nd}$ or $3^{rd}$ factor authentication is used, the SASO proxy unit 810 sends a request to the TPM/TSS 815 to retrieve the biometric authentication data for authentication, at step 910. The TPM 810 furnishes the biometric authentication data to the SASO proxy unit 810, at step 915. Next, the user 809 sends a request to register with a secure website to the WAA 820, at step 920.

The WAA 820 conveys to website A 830*a* the user's 809 wish to access it, at step 925. The WAA 820 receives and displays or otherwise indicates that the website A's 830*a* log-in prompt, at step 930. The SASO proxy unit 810, either by web-scraping or by cooperation through API or other parsing techniques, intercepts the website A's 830*a* authentication prompt from the WAA 820, at step 935. The SASO proxy unit 810 passes user ID information (this could be the device log-in info from the multi-factor authentication) to TPM/TSS 815, at step 940. A website-specific secure password is generated and securely stored by TPM/TSS 815 (either directly in TPM NV memory or in ordinary memory but encrypted by a TPM-protected binding storage key), at step 945. The SASO proxy unit 810 then intercepts the WAA 820 and fills in, by methods such as scraping or use of APIs or other parsing techniques, the website-specific secure password on the WAA's 820 password prompt for website A 830*a*, at step 950. The WAA 820 conveys the website-specific password to website A 830*a*, at step 955. The website A 830*a* registers the website-specific password and sends the access grant to the WAA, 820, at step 960. Once registration has been established, the website information such as the URL, digital certificate, user ID and password etc., are securely stored together as a database record in the TPM/TSS 815 and data blob protected by a TPM/TSS 815 binding storage key. The website-specific password can be re-used by the SASO proxy unit 810 for later log-in to the respective site. After website A 830*a* grants access to the WAA 820, the WAA sends a registration Okay and access grant message to the SASO proxy unit 810, at step 965. Normal web-based communication can follow, at step 970.

Note that steps 905 to 965 in FIG. 9 are depicted for the initial registration of the user's site-specific password, administered by the WTRU 805, at a website. After such initial registration, the user 809 can use the WAA 820 to request access to website A 830*a* (similarly as in step 920). Then, the SASO proxy unit 810 would intercept the log-in prompt from the WAA 820 (similarly as in step 935), to obtain the site-specific password stored at TPM/TSS 815 (similarly as in step 945), and fill in, by scraping, APIs or parsing, the log-in information specific for web-site A 830*a* on the WAA 820 (similarly as in step 950). Then, the WAA 820 sends the site-specific log-in information to the web-site A 830*a* (similarly as in step 955) and the web-site A 830*a*, after verifying the site-specific log-in info furnished, grants access for the service requested (similarly as in step 960) to the WAA 820, and the SASO Proxy unit 810 gets this access grant message from the WAA 820, and then can let the user 809 know that service is granted. Normal web-based communication (similarly as in step 970) can follow.

A similar set of procedures are executed when accessing an already established website for which the password is held within the TPM 820. For example, the steps in 905 to 970 can be repeated by the SASO proxy unit 810 to other sites, e.g. a different website, such as website B 830*b*, at step 975. Code integrity verification procedures enabled by TPM/TSS 815 are used to protect the integrity of the SASO proxy unit 810 and other software components to ensure secure transactions to occur. If a policy or profile is established, for example, to administer password update procedures, the TPM/TSS 815 also protects the policy and profile information by storing them in a memory protected by a TPM binding storage key. If the user 809 attempts to access a non-web third party service or a secure server, a procedure very similar to that illustrated above is used, by way of using a trust-mirroring procedure that can be managed by the DTM 835.

Figure 10:
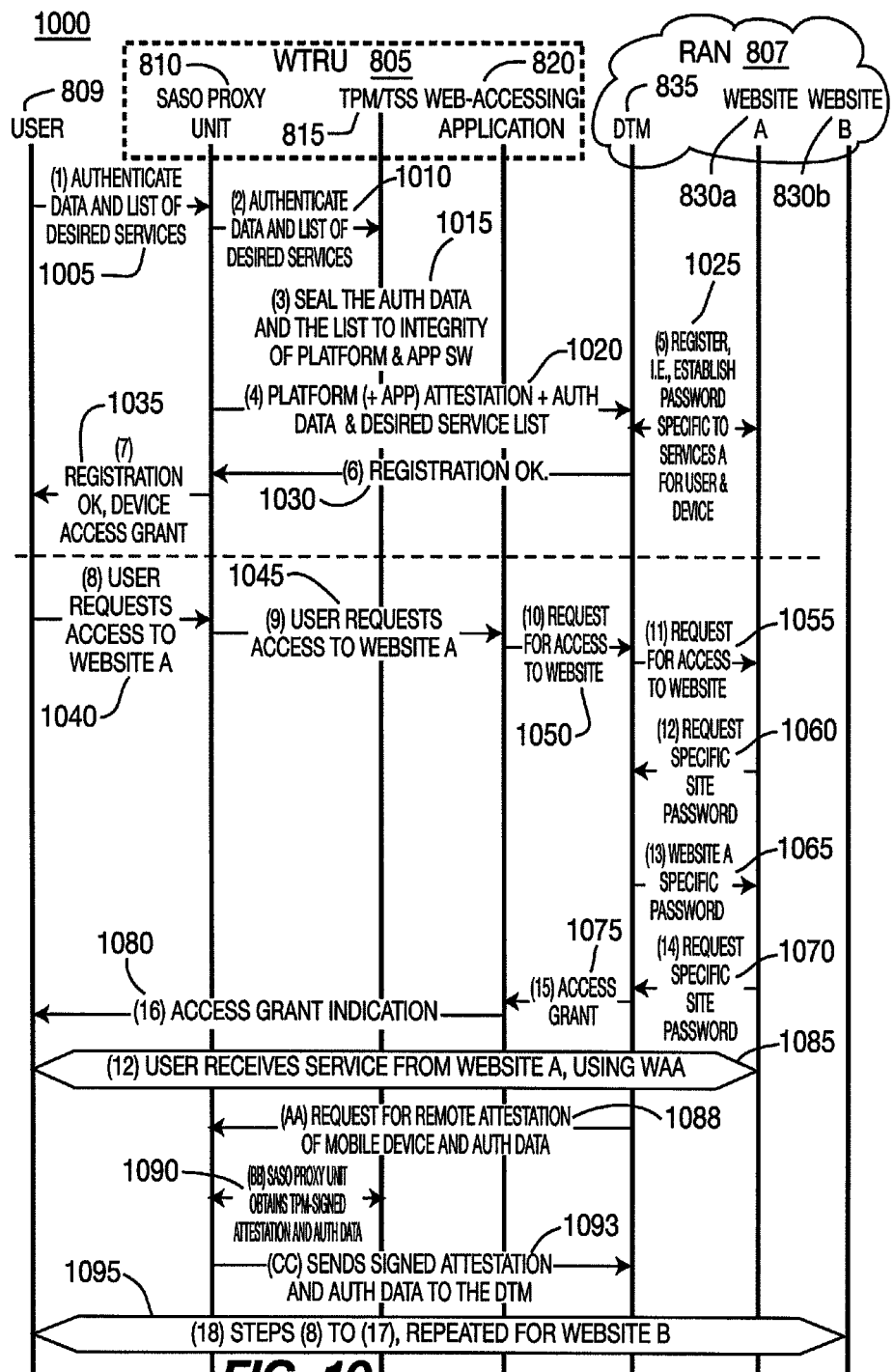
FIG. 10 is another exemplary flow diagram of an embodiment of secure automated sign-on using a TPM/TSS and a device trusted mirror.

FIG. 10 shows signaling between components shown in FIG. 8 in accordance with another embodiment. Specifically, FIG. 10 shows an exemplary procedure 1000 for SASO for web access using the TPM/TSS 815 and DTM 835 for registration of user authentication information at the WTRU 805 and then at the DTM 835. The DTM 835, typically residing in the RAN 807, but may be located outside of the RAN, provides services that 'mirror' the trustworthy services of the WTRU 805 and can attest to it to external requesters of such information. For example the DTM 835 may take on the task of managing the identity information as described for the TPM/TSS 815 in FIG. 9.

The user 809 initiates the procedure 1000 by registering their authentication information to the SASO proxy unit 810, at step 1005. Such registration could take place by using secure one factor or preferably two-factor authentication. Additionally, a third factor may be through biometric information held securely by TPM/TSS 815. Also at step 1005, or at a separate step, the user 809 may optionally provide a list of desired services.

Next, the SASO proxy unit 810 sends the authentication data and the list of desired services to the TPM/TSS 815, at step 1010. The TPM/TSS 815 seals the authentication data and the list of desired services to the integrity of the SASO proxy unit 810 and WAA 820, at step 1015. The SASO proxy unit 810 sends integrity information (or, equivalently, attestation information) for the WTRU 805, along with the authentication data and the list of applications and the desired services, to the DTM 835, at step 1020.

The DTM 835 registers the user's authentication credentials to website A, 830*a*, at step 1025. During this process, the DTM 835 and website A 830*a* mutually establish a password that will be used specifically to obtain service from website A 830*a*, for the user 809 and the WTRU 805. The DTM 835 sends the SASO proxy unit 810 a message indicating that the registration with website a 830*a* is complete, at step 1030. At step 1035, the SASO proxy unit 810 indicates to the user 809 that the registration is completed.

After the registration is completed, the user may access website A 830*a* in a SASO process (steps 1040-1095) mediated using the trusted DTM unit 835. At step 1040 the user 809 indicates to the SASO proxy unit 810 (or to the WAA 820, where the SASO proxy unit 830*a* can intercept this message by scraping or similar techniques) that the user 809 intends to access website A 830*a*. The SASO proxy unit 810 indicates to the WAA 820 that the user intends to access website A, at step 1045. Alternatively, if the user indicates their intent to access website A 830*a* directly to the WAA 820, and the SASO proxy unit 810 uses scraping to obtain the same information, step 1045 is not required.

The WAA 820 then sends the DTM 835 a request for access to website A 830a, at step 1050. The DTM 835 then forwards the request for access to website A 830a, at step 1055. Website A 830a sends the DTM unit 835 a request for a service-specific password, at step 1060. The DTM unit 835 sends website A, 830a the website-specific password, at step 1065. Website A 830a sends a service-access-grant message to the DTM unit 835, at step 1070. The DTM unit 835 sends the WAA 820 a service access-grant message, at step 1075. The WAA 820 indicates to the user 809 that access is granted for website A 830a, at step 1080. The user can start to receive service from website A, 830a, using WAA 820, at step 1085.

The DTM 835 can request and receive information to verify the attestation of the WTRU 805 and WAA 820 integrity and the integrity of the user authentication data and the service-specific data (such as the list of applications and the desired service), at steps 1088, 1090, and 1093. Such remote attestation procedure can be done using the TPM/TSS 815 remote attestation capability on the WTRU 805. The procedures of steps 1088, 1090, and 1093, can also be performed, for example, at the time when the WTRU 805 is booted-up. These steps can also be integrated in the service request message from the DTM 835 to the website as part of step 1050. Steps similar to 1040-1085 may be repeated for another website, such as website B, 830b, or any other website on the registered list.

In some alternative embodiments of FIG. 10, the WTRU 805 may lack a TPM/TSS 815. In such cases, the DTM 835 can still be used. Referring back to FIG. 10, if the WTRU lacks a TPM/TSS 815, the SASO proxy unit 810 will register the user and device authentication data, the list of desired services to the DTM unit 835 directly. After receipt of the information, the DTM 835 generates and maintains high-entropy site (or service)-specific passwords (similarly as in step 1125 in FIG. 10). When, after the initial registration, the user 809 intends to access website A 830a, then the SASO proxy unit 810 prompts the WAA 820 to access the DTM 835 (similar to step 1145 and 1150 in FIG. 10). The DTM 835 requests access to website A 830a (similar to step 1155). Website A 830a sends the DTM 835 a request for a service-specific password, (similarly to step 1160). The DTM 835 sends website A, 830a the website-specific password, (similar to step 1165). Website A 830a sends a service-access-grant message to the DTM 835, (similar to step 1170). The DTM 835 sends the WAA 820 an access-grant message, (similar to step 1175). The WAA 820 indicates to the user 809 that access is granted for website A 830a, (similar to step 1180). The user can start to receive service from website A, 830a, using WAA 820, (similar to step 1185).

Figure 11:
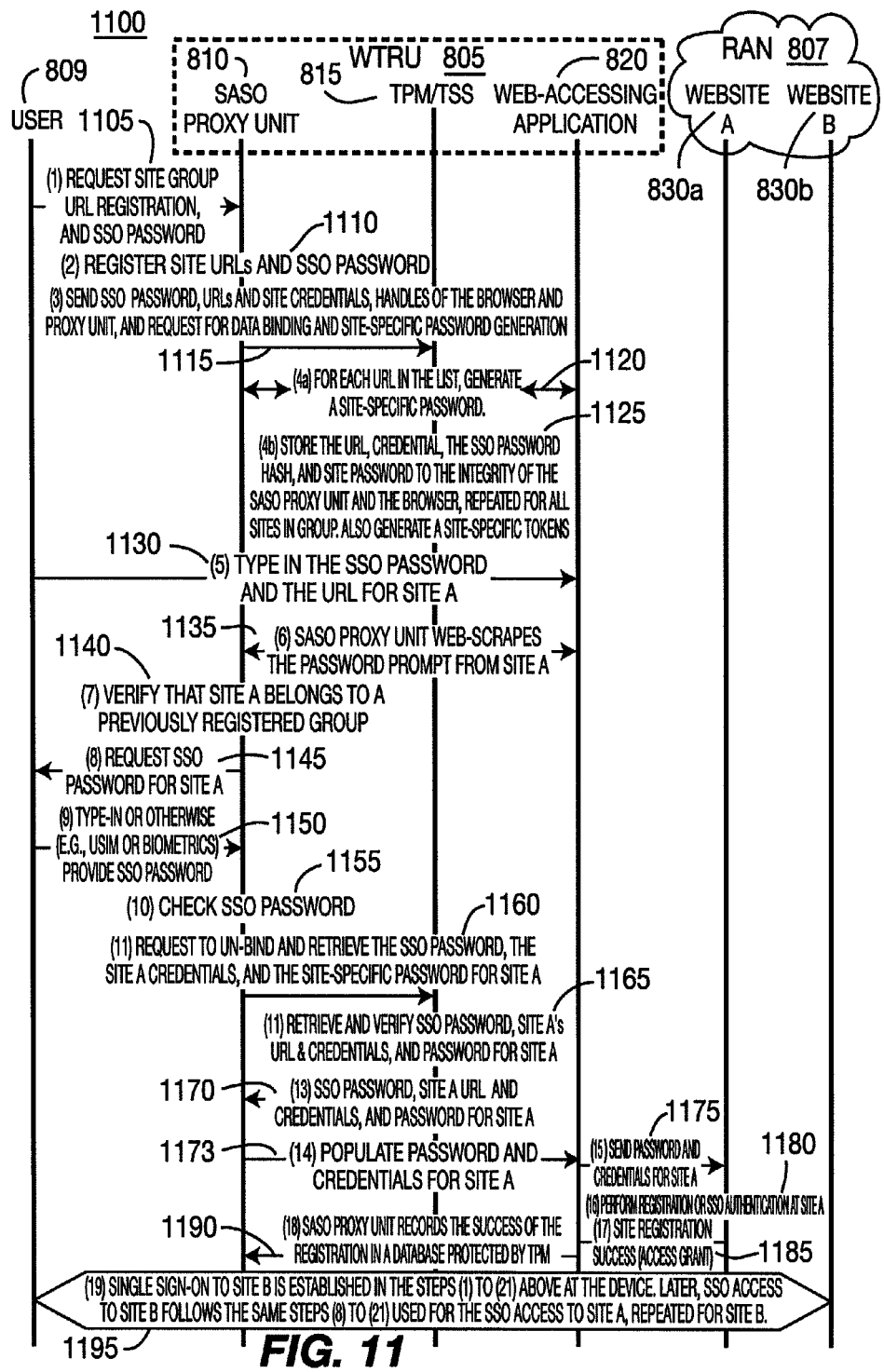
FIG. 11 is an exemplary flow diagram of an embodiment of SSO for web access using a TPM/TSS based on group-wise passwords using a TPM.

FIG. 11 shows the signaling between components of the system 800 of FIG. 8 in accordance with another embodiment. Specifically, FIG. 11 shows another exemplary procedure 1100 for SSO for web access using a TPM/TSS 815 in a manner that is more secure than prior art methods.

In this method, the user 809 configures a group of sites, the access to each of which is controlled by the SASO proxy unit 810 and with a common, group-specific log-in/password furnished by the user 809. By using such a procedure, the user 809 can control the access to particular groups of websites using group-specific passwords, thereby configuring the access rights of even the SASO proxy unit 810 as per the user's 809 intent to access only a particular group of websites. For example, if the user 809 only provides a common password for a financial websites group but does not provide another, different password for personal websites group, the SASO proxy unit 810 will be authorized only to administer the SSO operation for the sites belonging to the financial websites group. As shown in FIG. 11, this embodiment comprises the following preferred signaling steps by way of example. Other variations in sequence and/or content are possible and still within the scope of the embodiment.

The user 809 initiates the procedure 1100, possibly upon prompt by the SASO proxy unit 810, by sending to the SASO proxy unit 810 a request for establishment of a website group, at step 1105. The request may include website A 830a and website B 830b, and also a SSO password he has made for the website group, and the URLs of the websites belonging to the group. This step could be done in an incremental manner, whereby the user 809 starts the group by having only the website A 830a, and then later adding or deleting other websites. If such website list update is performed at any point, the SASO proxy unit 810 will need to request procedures for adding, deleting, or even un-binding and re-binding, certain data held by the TPM/TSS 815 (and some of them also by the SASO proxy unit 810).

Next, the SASO proxy unit 810 registers the website URLs and the single SSO password for each website in the website group, at step 1110. The SASO proxy unit 810 then sends the TPM/TSS 815 the SSO password, the URLs and the website credentials for all the websites belonging to the group, the address handle of the WAA 820 and the SSO proxy unit 810, and also a request for data binding and for website-specific password generation to the TPM/TSS 815, at step 1115. For each URL in the list of websites, the TPM/TSS 815 generates a cryptographically strong password, using the TPM random number generator (RNG), at step 1120. At step 1125, the TPM/TSS 815 then binds the website-specific URL, any credentials (including site certificates), the SSO password, and the site-specific password that it generated, in a data blob encrypted with a TPM storage key. Such a key is 'bound' to the platform (e.g. WTRU, or computer) that houses the TPM. If in step 1105 the user 809 has indicated an update (add, delete, or change) of the list of the group of websites with its associated information (URLs, credentials, etc), there must be an indication from the SASO proxy unit 810 and the TPM/TSS 815 to either add or delete the website-specific records for the affected websites.

Next, the user 809 provides the URL for website A 830a to the WAA 820, at step 1130. The SASO proxy unit 810, either by web-scraping, or by cooperation through API or other parsing techniques, intercepts the password prompt from website A 830a, at step 1135. Then the SASO proxy unit 810 verifies if website A 830a is a member of a registered group of websites and identifies such group if the determination is positive, at step 1140. The SASO proxy unit 810 requests the human user 809 to provide the SSO password for the website-group to which website A 830a belongs, at step 1145. The human user 809 provides (by e.g. USIM, biometrics, or typing) the SSO password and the website URL for website A 830, at step 1150. Alternatively, steps 1145 and 1150 may be made transparent and automatically supplied by the SASO proxy unit 810. Next, the SASO proxy unit 810 checks the SSO password the user 809 provided, at step 1155. The SASO proxy unit 810 sends the TPM/TSS 815 a request to un-bind and retrieve the password for website A 830a, at step 1160. In this request, the SASO proxy unit 810 includes the SSO password and the site URL for website A 830a. The TPM/TSS 815 uses the SSO password and the URL for website A 830a as the data handle to un-bind the site-specific password and credentials for website A 830a from the previously stored data blob, at step 1165. After un-binding and retrieving the previously stored website-specific password, URL list, and website-specific credentials, the TPM/TSS 815 verifies the SSO password and the website URL it received from the SASO proxy unit 810, against the values of the data it just recovered from binding storage. If verification is achieved in step 1165, above, the TPM/TSS 815 provides the website-specific password and credentials for website A 830*a* to the SASO proxy unit 810, at step 1170.

The SASO proxy unit 810 then populates, using such techniques as web scraping, APIs or other parsing techniques, the password and credential fields for website A 830*a* on the WAA 820, at step 1173. Then, the WAA 820 is filled and sends the website-specific password and credential to website A 830*a*, at step 1175. The password and credential are then registered at website A 830*a*, at step 1180. At step 1185, success of the website registration is indicated to the WAA 820. At step 1190 success of the website registration is indicated to the SASO proxy unit 810 and recorded in its database. Also at step 1190, the record of the success of the website registration is also recorded as a stored measurement log (SML), in a secure memory protected by the TPM key. The establishment of the trusted SSO including, the site-specific passwords and credentials held by the TPM/TSS 815 is completed, at step 1195.

After website registration is established, when the user 809 wants to access website A 830*a* for sign-on to use the website's services at a later time, essentially the same steps as 1130-1185 take place, only in this case the end result is not initial site registration but SSO sign-on to website A 830*a*. Also, if the user 809 intends to register to website B 830*b* instead of website A 830*a*, then the same steps used for website A 830*a* previously can be used for SSO registration or authentication of website B 830*b*. However, the website-specific information for website B 830*b* such as its URL, credential, site-specific password, and token will be used instead of those for website A 830*a*.

In an alternative embodiment, group-wise access control can be performed without the explicit configuration by the user 809. Instead, the SASO proxy unit 810 can be provided by a policy or profile data (which itself could be protected by a TPM) that governs the access to different types of website groups. In this an embodiment, the group-wise access control will be configured by the SASO proxy unit 810 at installation time. Additionally, policy updates may also be possible after the installation time.

Figure 12:
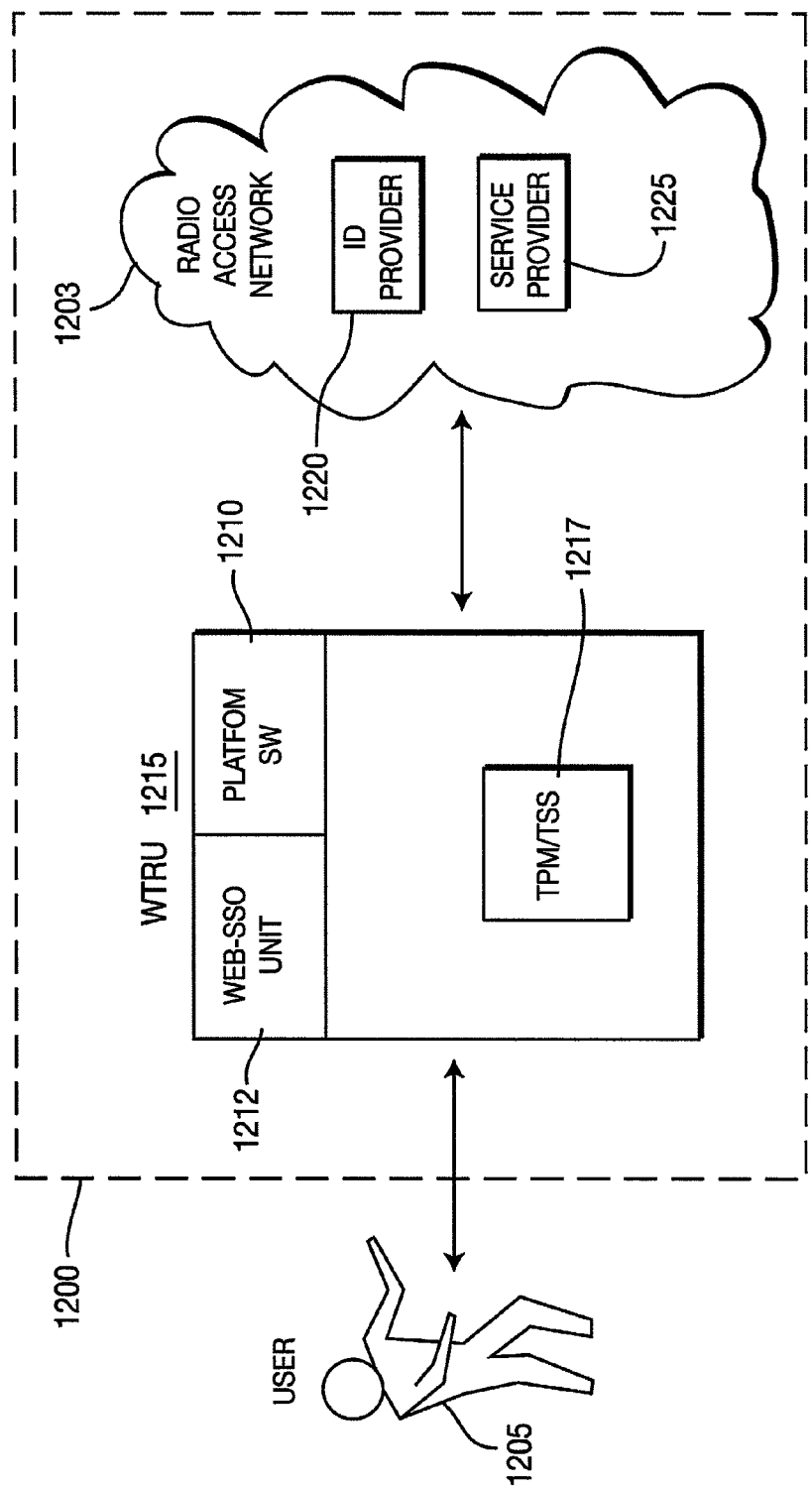
FIG. 12 is an exemplary block diagram of a wireless communication system using Liberty-Alliance ID-FF.

FIG. 12 is an exemplary block diagram of wireless communication system 1200 that is configured in accordance an alternative embodiment. The system 1200 is a Liberty Alliance compliant wireless communication system that includes at least one WTRU 1215 and a radio access network (RAN) 1203. The WTRU is configured to interact with a user 1205 and includes a web-SSO unit 1212, a platform processing unit 1210, an a TPM/TSS 1217. The platform processing unit 1210, may be implemented in as software SW or hardware. The RAN 1203 includes an ID provider 1220 and a service provider 1225. Alternatively, the ID provider 1220 may be located outside of the RAN 1203, such as on the public internet.

Figure 13:
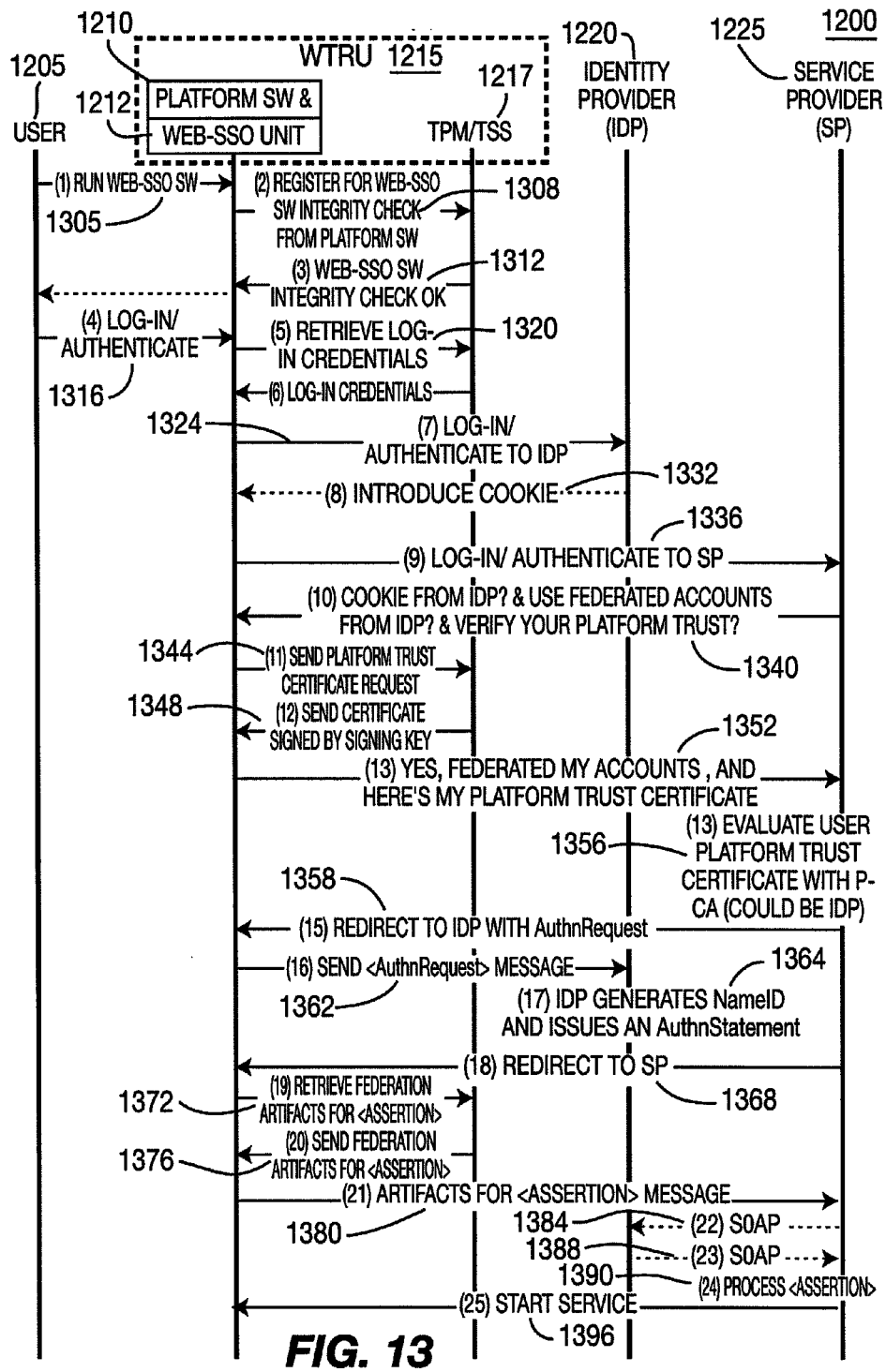
FIG. 13 is an exemplary flow diagram of an embodiment of TPM/TSS protected web-SSO using Liberty-Alliance ID-FF.

FIG. 13 shows the signaling between components of the system 1200 of FIG. 12 in accordance with another embodiment. Specifically, in FIG. 13, the ID-FF/SAML based web-SSO technique is also combined with the integrity-checking mechanisms provided by the TPM/TSS 1217. Other variations in sequence and/or content are possible and still within the scope of this embodiment. The user 1205 initiates the procedure 1300 by indicating an intention to run the web-SSO unit 1212 (e.g., by clicking on it, or, by default by system booting, etc.), at step 1303. The platform processing unit 1210 requests the TPM/TSS 1217 to perform a code integrity check of the web-SSO unit 1212, at step 1308. The TPM 1217 runs the code integrity check and conveys the result to the platform processing unit 1210, at step 1312.

If the check in step 1312 is positive, the log-in or authentication information is provided to the platform processing unit 1210 and passed to the web-SSO unit 1212, at step 1316. The web-SSO unit 1212 request the TPM 1217 to retrieve log-in credentials that had been previously stored using a TPM key, at step 1320. The TPM 1217 retrieves and passes the log-in credential data to the web-SSO software 1212, at step 1324. The web-SSO unit 1212 uses the retrieved log-in credentials data to log-in to the IDP 1220, at step 1328. The IDP 1220 sends an introduction cookie to the web-SSO unit 1212, at step 1332.

The web-SSO unit 1212 then authenticates to the SP 1225, at step 1336. At step 1340, the SP 1225 asks the web-SSO unit 1212 1) whether the web-SSO unit 1212 has a cookie from the IDP 1220, 2) whether the web-SSO unit 1212 intends to use its federated ID as supported by the IDP 1220, and 3) whether the web-SSO unit 1212 can provide a certificate stating the status of its platform security state which is signed by a platform-bound TPM private key, whose public key is either already stored at the SP or can be obtained by a PCA. Optionally, the PCA, may be the IPD, 1220.

The web SSO unit 1212 then sends the platform trust state to the TPM/TSS 1217, at step 1344. The TPM/TSS 1217 creates and passes a certificate signed by a TPM-held private signing key, that attests to the platform's trust state, to the web-SSO software 1212, at step 1348. The web-SSO unit 1212 indicates to the SP 1225 that 1) yes it has the cookie from the IDP 1220, 2) yes it intends to use its federated account maintained by the IDP 1220, and also sends 3) the platform security status certificate to the SP 1225, at step 1352. The SP 1225 evaluates the trust certificate sent by the web-SSO unit 1212 with aid from a PCA, at step 1356. Then the SP 1212 requests the web-SSO unit 1212 to redirect and authenticate again, this time using federated authentication request, at step 1358.

Next, the web-SSO unit 1212 sends a federated authentication request to the IDP 1220, at step 1362. The IDP 1220 generates a federated NameID and associated authentication statement, at step 1364. The IDP 1220 requests the web-SSO unit 1212 to redirect to the SP 1225, at step 1368. The web-SSO unit 1212 requests the TPM/TSS 1217 to retrieve federation artifacts of the federation <Assertion> that had been stored with a key protected by the TPM/TSS 1217, at step 1372. The TPM/TSS 1217 retrieves the artifact data and passes it to the web-SSO unit 1212, at step 1372. The web-SSO unit 1212 sends the retrieved federation <Assertion> artifacts that are held by the IDP 1220, to the SP 1225, at step 1380.

Next, the SP 1225 initiates verification process with the IDP 1220 to verify the <Assertion> for the human user 1205, using SOAP protocol, at step 1384. The IDP 1220 reciprocates the verification process using the SOAP protocol, at step 1388. The SP 1225 evaluates the <Assertion> and the federated account for the human user 1205, at step 1392. Finally, the SP 1225 indicates to the web-SSO unit 1212 the granted start of service, and an indication is provided to the human user 1205 (e.g. by display, etc), at step 1396.

In an alternative embodiment of FIG. 13, the trust state of the device may be evaluated by the IDP 1220 once and then later communicated to each SP 1225 as necessary, for its use. Delivery of such information can be done by means such as cookies or other existing or modified messages/protocols within the federated schemes such as SAML or SOAP procedures.

Although the features and elements are described in the disclosed embodiments in particular combinations, each feature or element can be used alone without the other features and elements of the preferred embodiments or in various combinations with or without other features and elements of the disclosed. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an internet browser, and/or any wireless local area network (WLAN) module.

What is claimed is:

1. A wireless transmit/receive unit (WTRU) comprising:
an SSO proxy unit configured to:
receive user authentication data from a user,
obtain a request for one or more user credentials for authenticating with a service provider of a service,
access the user credentials from a security module using the user authentication data received from the user, and
provide the user credentials to a web accessing application (WAA);
the security module being configured to:
store user authentication data and the user credentials for authenticating the user with the service provider,
compare the received user authentication data to the stored user authentication data to authenticate the user with the WTRU, and
forward the stored user credentials to the SSO proxy unit when the user is authenticated with the WTRU; and
the WAA being configured to automatically receive the user credentials provided by the SSO proxy unit and transmit the provided user credentials to the service provider to authenticate the user with the service provider.

2. The WTRU of claim 1, wherein the SSO proxy unit requires the user authentication data to access the user credentials stored in the security module.

3. The WTRU of claim 1, wherein the user authentication data is based on at least two factors.

4. The WTRU of claim 3, wherein one of the factors is the user's biometric information.

5. The WTRU of claim 3, wherein one of the factors is a pin or a password.

6. The WTRU of claim 1, wherein access is automatically granted to a plurality of services in a pre-identified group of services once the user authentication data is successfully received at the SSO proxy unit.

7. The WTRU of claim 1, wherein the user credentials include at least an identity and a service specific password associated with the service.

8. The WTRU of claim 7, wherein the security module is further configured to generate and maintain credentials that are different for each service of a plurality of services.

9. The WTRU of claim 8, wherein the service specific password is a high entropy password.

10. The WTRU of claim 1, wherein the WTRU is configured to access an additional service when the user is authenticated with the WTRU.

11. The WTRU of claim 1, wherein the SSO proxy unit is further configured for receiving at least a secure sign on certificate from the service provider and for using the secure sign on certificate for authenticating the user with the service provider.

12. The WTRU of claim 1, wherein the SSO proxy unit is further configured for prompting the user whether to use an SSO operation for a group of services.

13. The WTRU of claim 12, wherein the prompting includes providing an option to use the SSO operation for a sub group of the group of services.

14. The WTRU of claim 13, wherein the WTRU is configured for performing the SSO operation using Liberty Alliance identity federation framework (ID-FF).

15. The WTRU of claim 1, wherein the WTRU is configured for authenticating a device trusted mirror (DTM) to establish a trusted relationship with the DTM and a secure link with a radio access network.

16. The WTRU of claim 15, wherein the DTM is configured for providing services that mirror the trustworthiness of the WTRU and for providing trustworthiness information to external requestors of such information.

17. A method for providing secure single sign-on (SSO) for at least one service of a group of services accessed by a wireless transmit/receive unit (WTRU) having a security module and a web accessing application (WAA), the method comprising:
the WTRU determining the group of services;
authenticating a user at the WTRU using at least one authentication factor;
obtaining a request for login information, for authenticating the user with a service provider of a service belonging to the group of services;
accessing the login information, for authenticating the user with the service provider, from the security module when the user is authenticated with the WTRU using the at least one authentication factor;
providing the login information from the security module to the WAA; and
securely signing on to the service belonging to the group of services when the user is authenticated using the provided login information.

18. The method of claim 17, wherein providing the login information comprises:
  determining whether the request for the login information originated from at least one service belonging to the group of services; and
  when the request for login information originated from the at least one service belonging to the group of services, providing the login information from the security module to the WAA.

19. The method of claim 18, wherein the login information comprises credentials for logging in to the service provider, and wherein the providing the login information is performed while protecting a security of the credentials with the security module.

20. The method of claim 17, further comprising generating, via the security module, random site-specific passwords for accessing services belonging to the group of services, and wherein the login information comprises at least one of the random site-specific passwords.

21. The method of claim 17, further comprising storing, via the security module, random passwords generated for accessing services belonging to the group of services.

22. The method of claim 17, wherein determining the group of services comprises receiving the group of services from a user.

23. The method of claim 17, further comprising recording password information by storing the password information in the security module.

24. The method of claim 23, wherein the recorded password information is stored in the security module using key binding techniques.

25. The method of claim 17, further comprising storing a unique identity for the WTRU in the security module.

26. The method of claim 17, further comprising storing a unique identity for the WTRU in a universal subscriber identity module (USIM).

27. The method of claim 24, wherein using key binding techniques includes using an encryption key hierarchy based on a unique identity.

28. The method of claim 17, wherein the securely signing on to the service belonging to the group of services comprises creating a unique user identification and password associated with a certificate information of the service.

29. The method of claim 17, further comprising signing on to other services belonging to the group of services by automatically transmitting a user credential to at least one other service provider of the other services.

30. The method of claim 29, wherein the user credential is transmitted along with data.

31. The method of claim 17, further comprising sensing biometric information of the user.

32. The method of claim 31, wherein the at least one authentication factor comprises the sensed biometric information.

33. The WTRU of claim 1, wherein the security module is a trusted platform module.

34. The WTRU of claim 1, wherein the security module is a smartcard.

35. The WTRU of claim 1, wherein the security module is a subscriber identity module (SIM) card.

36. The WTRU of claim 1, wherein the security module is a universal integrated circuit card (UICC).

37. The WTRU of claim 1, wherein the SSO proxy unit is configured for recording password information and storing the password information in the security module.

38. The WTRU of claim 37, wherein the password information is stored in the security module using key binding techniques.

39. The WTRU of claim 1, wherein the security module is configured for storing a unique identity for the WTRU.

40. The WTRU of claim 39, wherein the security module is a universal subscriber identity module (USIM).

41. The WTRU of claim 38, wherein using key binding techniques includes using an encryption key hierarchy based on a unique identity.

42. The method of claim 17, wherein the security module is a trusted platform module.

43. The method of claim 17, wherein the security module is a smartcard.

44. The method of claim 17, wherein the security module is a subscriber identity module (SIM) card.

45. The method of claim 17, wherein the security module is a universal integrated circuit card (UICC).

46. The method of claim 17, further comprising generating, via the security module, high entropy site-specific passwords for accessing services belonging to the group of services, and wherein the login information comprises at least one of the high entropy site-specific passwords for accessing the service.

47. A method for performing secure password management using a single sign-on (SSO) technique through a device trust mirror (DTM) residing in an external network that acts as a proxy for a wireless transmit/receive unit (WTRU) trust service, the method comprising:
  receiving, via the DTM, user authentication data, integrity information for the WTRU, and a list of desired services from the WTRU, wherein the user authentication data is received, via a single sign-on (SSO) proxy unit, from a security module on the WTRU;
  establishing, via the DTM, login information for authenticating with a service provider of at least one service in the list of desired services;
  receiving, via the DTM, an access request from the WTRU, the access request requesting access to the at least one service;
  transmitting the request for access from the DTM to the service provider of the at least one service;
  providing, via the DTM, the established login information for authenticating with the service provider of the at least one service when the user is authenticated with the WTRU using the user authentication data; and
  transmitting an access grant message from the DTM to the WTRU to enable the WTRU to access the at least one service.

48. The method of claim 47, further comprising using the integrity information to establish a trusted relationship with the WTRU and a secure link to the WTRU.

49. The method of claim 47, wherein the integrity information includes signed attestation data and the user authentication data from the WTRU.

50. The method of claim 47, wherein establishing login information comprises generating a randomized password for accessing the at least one service.

51. The method of claim 47, wherein establishing login information comprises generating a high entropy password for accessing the at least one service.

* * * * *